US009919311B2

(12) United States Patent
Puntambekar et al.

(10) Patent No.: US 9,919,311 B2
(45) Date of Patent: Mar. 20, 2018

(54) MICROFLUIDIC ASSAY PLATFORMS

(75) Inventors: Aniruddha Puntambekar, Mason, OH (US); Junhai Kai, Loveland, OH (US); Se Hwan Lee, Cincinnati, OH (US); Chong Ahn, Cincinnati, OH (US)

(73) Assignee: SILOAM BIOSCIENCES, INC., Forest Park, OH (US)

( * ) Notice: Subject to any disclaimer, the term of this patent is extended or adjusted under 35 U.S.C. 154(b) by 0 days.

(21) Appl. No.: 13/384,963

(22) PCT Filed: Jul. 20, 2010

(86) PCT No.: PCT/US2010/042506
§ 371 (c)(1),
(2), (4) Date: Aug. 31, 2012

(87) PCT Pub. No.: WO2011/011350
PCT Pub. Date: Jan. 27, 2011

(65) Prior Publication Data

US 2012/0328488 A1 Dec. 27, 2012

Related U.S. Application Data

(60) Provisional application No. 61/226,764, filed on Jul. 20, 2009, provisional application No. 61/297,221, filed on Jan. 21, 2010.

(51) Int. Cl.
*G01N 1/28* (2006.01)
*B01L 3/00* (2006.01)

(52) U.S. Cl.
CPC ........... *B01L 3/5025* (2013.01); *B01L 3/5085* (2013.01); *B01L 3/50273* (2013.01); *B01L 2300/069* (2013.01); *B01L 2300/088* (2013.01); *B01L 2300/0829* (2013.01); *B01L 2300/0851* (2013.01); *B01L 2300/0861* (2013.01); *B01L 2300/0883* (2013.01); *B01L 2300/161* (2013.01); *B01L 2400/0406* (2013.01)

(58) Field of Classification Search
CPC ....... B01L 2300/069; B01L 2300/0829; B01L 2300/0851; B01L 2300/0883; B01L 2300/161; B01L 2400/0406; B01L 3/5025; B01L 3/50273; B01L 3/5085
USPC ............ 422/502–504, 400; 435/288.3–288.5
See application file for complete search history.

(56) References Cited

U.S. PATENT DOCUMENTS 6,322,683 B1 * 11/2001 Wolk ................ B01L 3/502707 204/600
6,485,690 B1 * 11/2002 Pfost .................... B01J 19/0046 422/552
2005/0266582 A1 * 12/2005 Modlin ............. B01L 3/502723 436/164

(Continued)

*Primary Examiner* — Jennifer Wecker
(74) *Attorney, Agent, or Firm* — Dinsmore & Shohl, LLP

(57) ABSTRACT

This invention discloses novel improvements to conventional microtiter plates, involving integrating microfluidic channels with such microtiter plates to simplify the assay operation, Increase operational speed and reduce reagent consumption. The present invention can be used in place of a conventional microliter plate and can be easily substituted without any changes to the existing instrumentation systems designed for microtiter plates. The invention also discloses a microfluidic device integrated with sample loading wells wherein the entire flow process is capillary driven.

20 Claims, 33 Drawing Sheets

Microfluidic 96 well plate concept. The plate matches the dimensions of conventional microplates (as defined by accepted ANSI standards). The positions of the wells also matches ANSI standards. Each well is connected to a microchannel on the opposing face of the substrate. Figure does not show sealing layer (for microchannels) and absorbent pad for clarity. Also, selected wells in lower right hand corner of top figure do not show microchannel pattern for ease of explanation.

(56) References Cited

U.S. PATENT DOCUMENTS

| | | | | |
|---|---|---|---|---|
| 2007/0003448 | A1* | 1/2007 | Kanigan | B01L 3/5025<br>422/400 |
| 2007/0014695 | A1* | 1/2007 | Yue et al. | 422/100 |
| 2007/0166771 | A1* | 7/2007 | Kapur | B01L 3/5027<br>435/7.2 |
| 2008/0115599 | A1* | 5/2008 | Masters | B01L 3/502715<br>73/866 |
| 2009/0004754 | A1* | 1/2009 | Oldenburg | 436/174 |
| 2009/0136982 | A1* | 5/2009 | Tang | B01F 5/102<br>435/29 |
| 2011/0124130 | A1* | 5/2011 | Wagner | G01N 33/54366<br>436/518 |

* cited by examiner

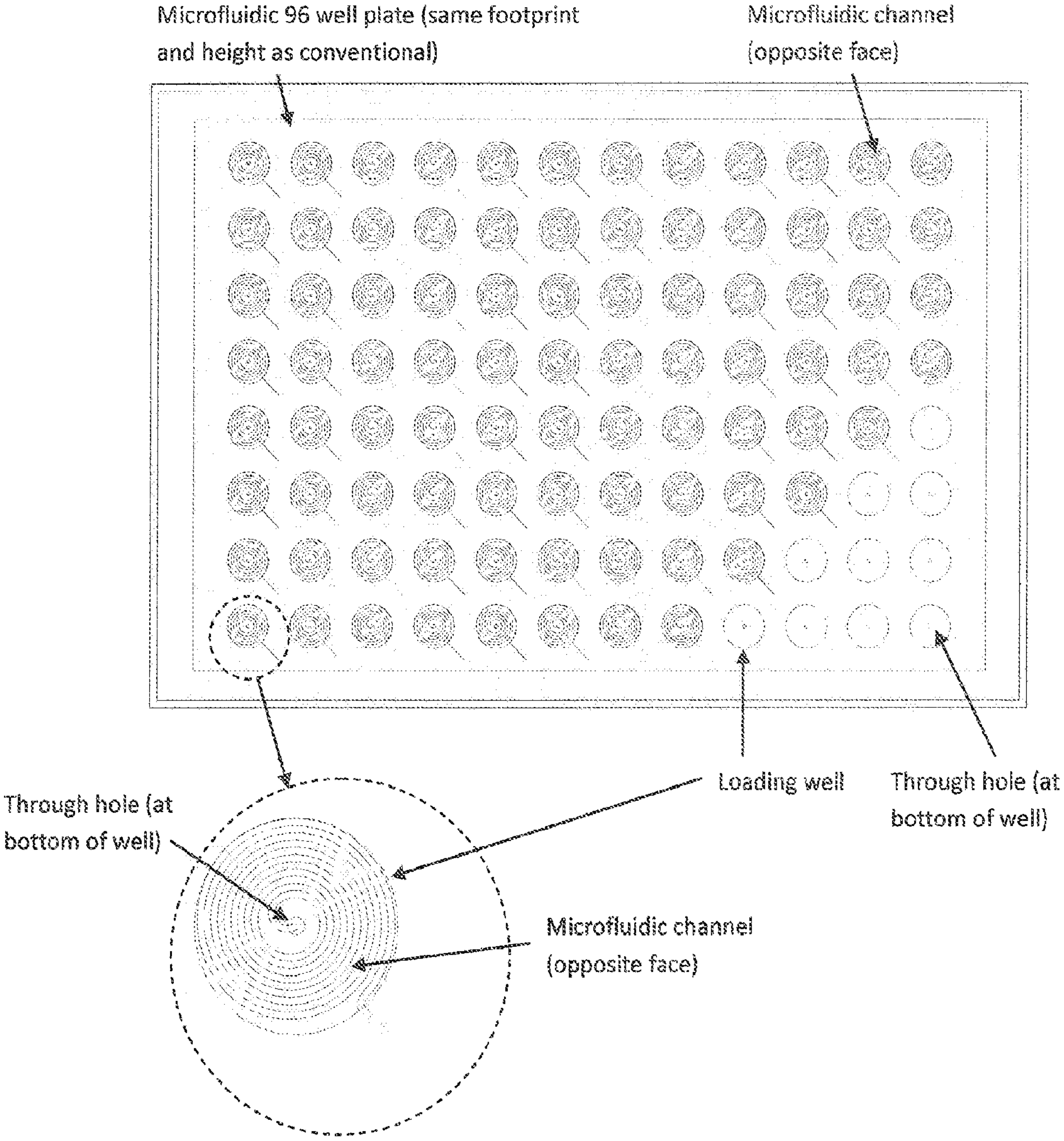

FIG 1. Microfluidic 96 well plate concept. The plate matches the dimensions of conventional microplates (as defined by accepted ANSI standards). The positions of the wells also matches ANSI standards. Each well is connected to a microchannel on the opposing face of the substrate. Figure does not show sealing layer (for microchannels) and absorbent pad for clarity. Also, selected wells in lower right hand corner of top figure do not show microchannel pattern for ease of explanation.

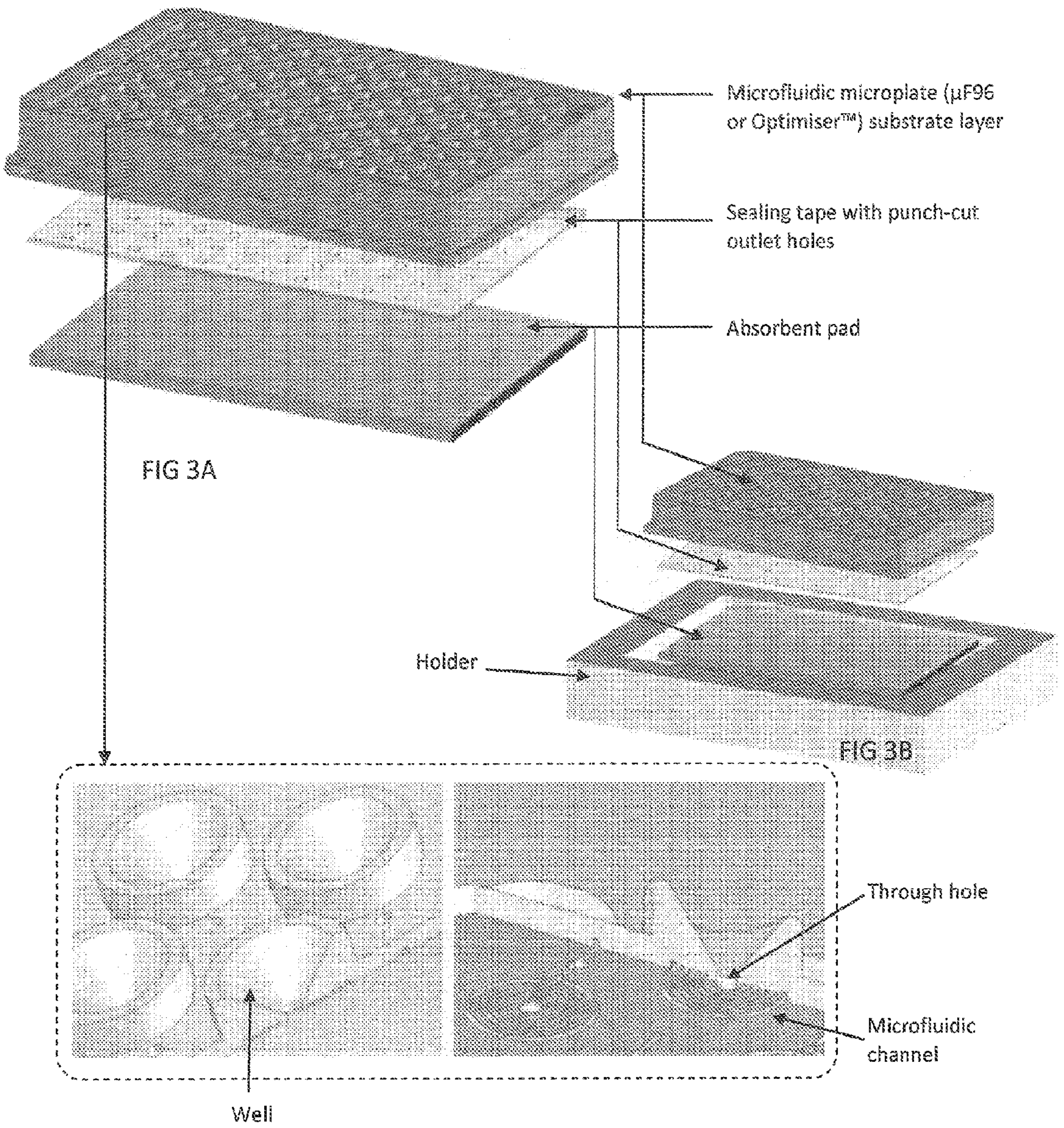

FIG 3. 3D schematic views of an embodiment of the microfluidic microplate. FIG 3A shows the basic constituents of the microfluidic microplate – namely the substrate layer, sealing layer and absorbent pad. FIG 3B shows the use of the microfluidic microplate with a suitable designed holder. Insert images at bottom show close up views of the substrate layer showing the well, through hole and microchannel structures.

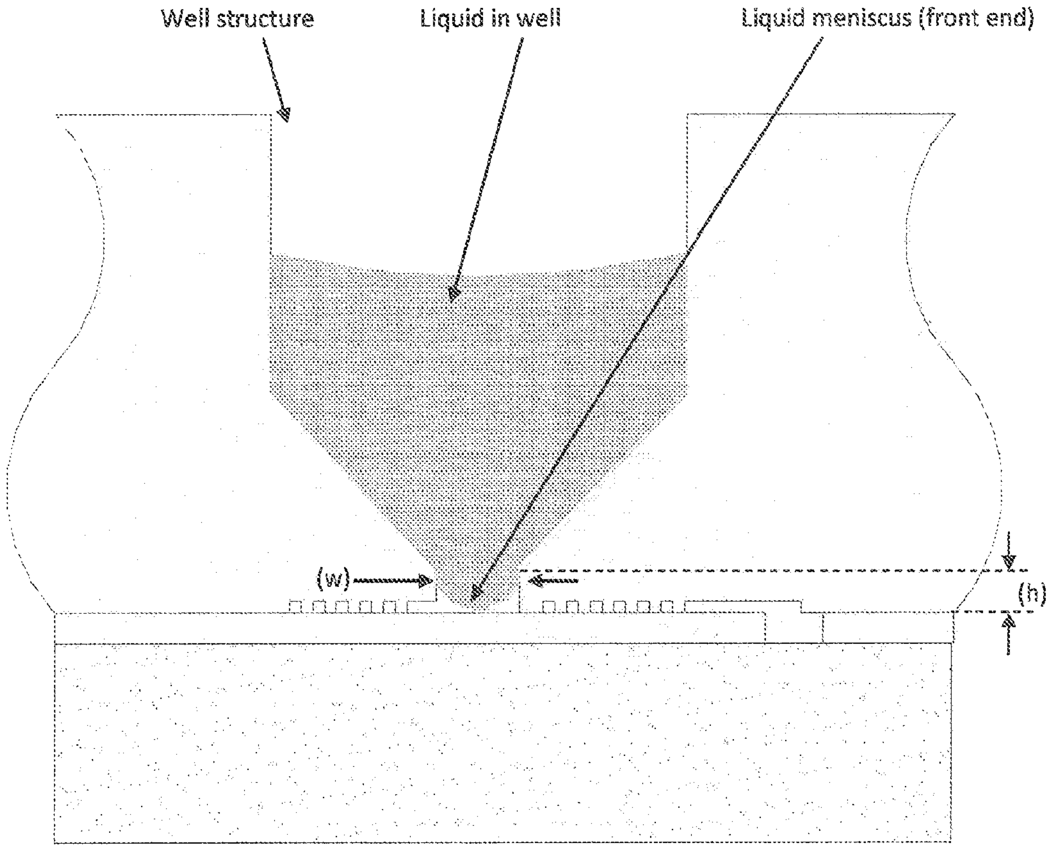

FIG 4A. Configuration feature of the interface between the well structure and the microchannel. Preferably, the width of the hole (w) shall be greater than, and at least equal to, the depth (d) of the hole. This ensures that when liquid is introduced in the well, the front meniscus of the liquid can "dip" and touch the surface of the sealing tape. The meniscus also touches all 4 "walls" of the microchannel connected to one part of the hole (left hand side in above figure). Thereafter, capillary forces will draw the liquid from the well and fill the microchannel.

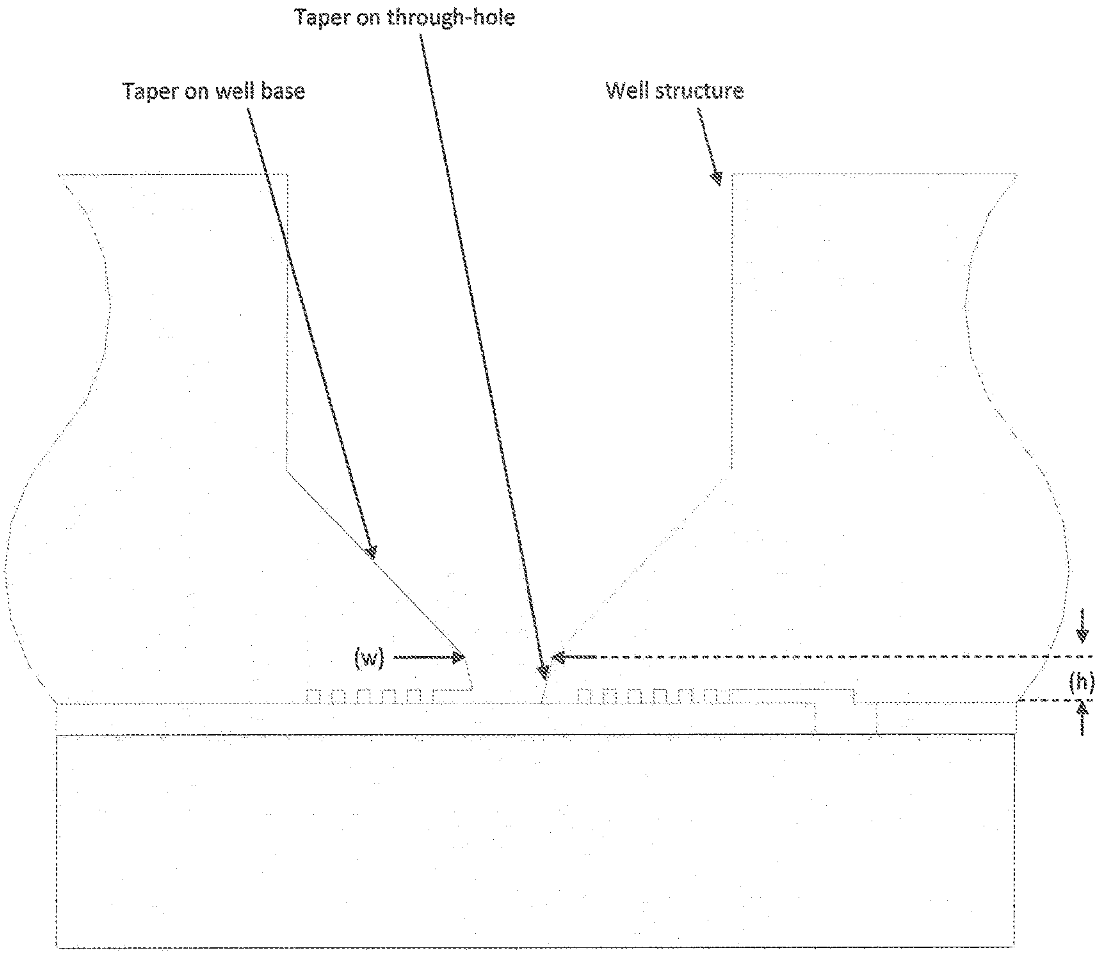

FIG 4B. Configuration feature of the interface between the well structure and the microchannel. Preferably, the width of the through hole at the top (w) shall be greater than, and at least equal to, the depth (d) of the hole; and furthermore the through-hole shall also have tapered walls. The taper angle (with respect to horizontal) of the walls of the through hole will be greater than or equal to the taper angle on the walls at the base of the well structure immediately preceding the through hole. This ensures that when liquid is introduced in the well, the front meniscus of the liquid can "dip" and touch the surface of the sealing tape. The meniscus also touches all 4 "walls" of the microchannel connected to one part of the hole (left hand side in above figure). Thereafter, capillary forces will draw the liquid from the well and fill the microchannel.

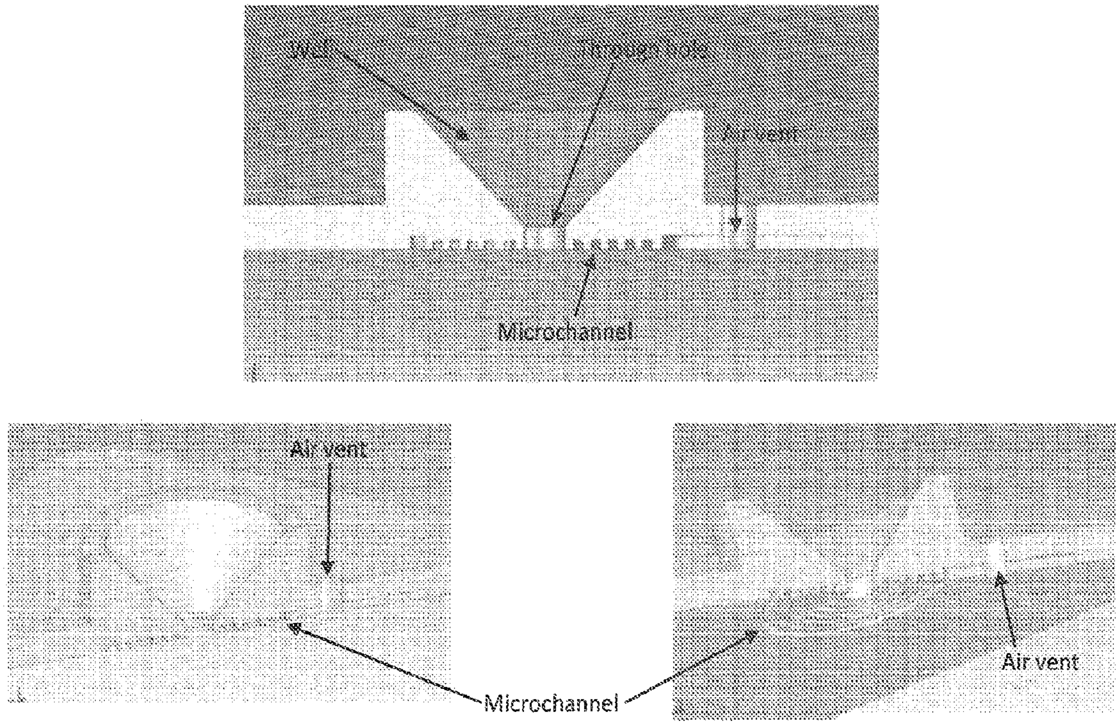

FIG 6. 3D schematic illustration of the air-vent concept to ensure ability to "stop" flow when the liquid has emptied from the well but is still occupying the microchannel. The air vent allows the "negative pressure" (i.e. capillary suction force) of the absorbent pad to equilibrate with atmospheric pressure to ensure there is no pressure differential across the liquid column in the microchannel. Note that sealing tape and pad are not shown for clarity. In this configuration embodiment, the air vent is slightly offset from the outlet (outlet at end of microchannel towards right of air vent in above images). Liquid is loaded in the well, drawn in the channel by capillary force and transported to the pad. After the well is completely emptied, the front end of the liquid column is still in contact with the absorbent pad which will continue to draw more liquid. The liquid will then retract back into the channel (from front end), wherein using embodiments shown in FIG 8 ensure liquid always retracts from outlet, until the liquid crosses the air vent hole. As the liquid retracts from the outlet hole (on tape), flow continues because of thin film of liquid in the 2 corners where the channel is sealed by hydrophilic tape. As the liquid crosses the air vent, the capillary suction force of the pad is equilibrated by the atmospheric pressure from the air vent causing flow to stop.

FIG 7A

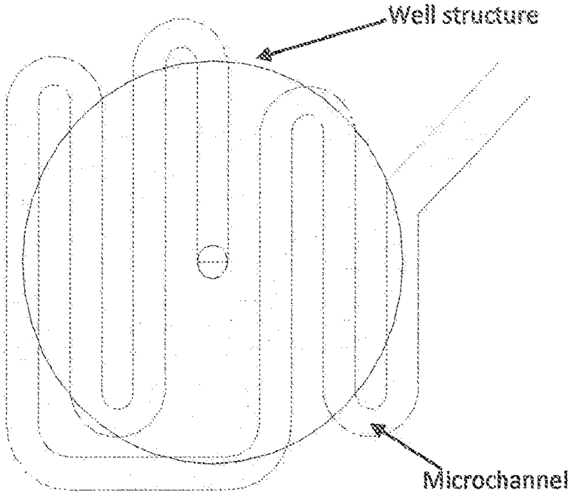

FIG 7B

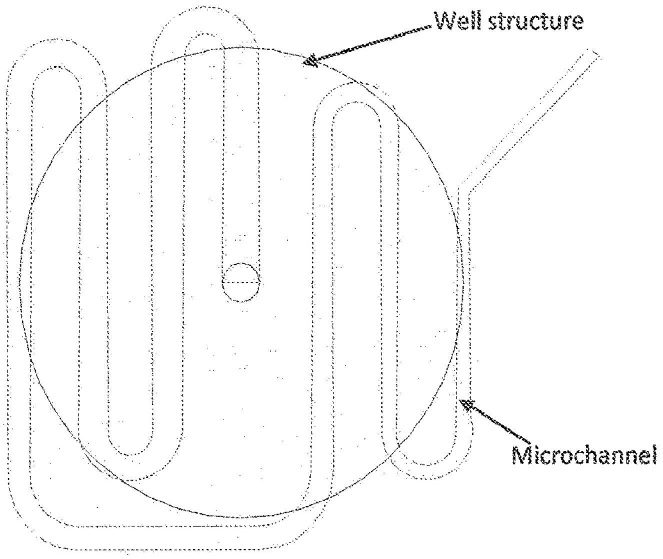

FIG 7. Configuration embodiments of the microchannel pattern. The channel pattern may be serpentine as shown in FIG 7A. The channel pattern may further be modified such that there is a continuous taper in the channel path from the interface hole to the absorbent pad. The taper will ensure that there is increasing capillary force on the front end of the liquid column and result in a different flow rate than in the case when the channel is not tapered.

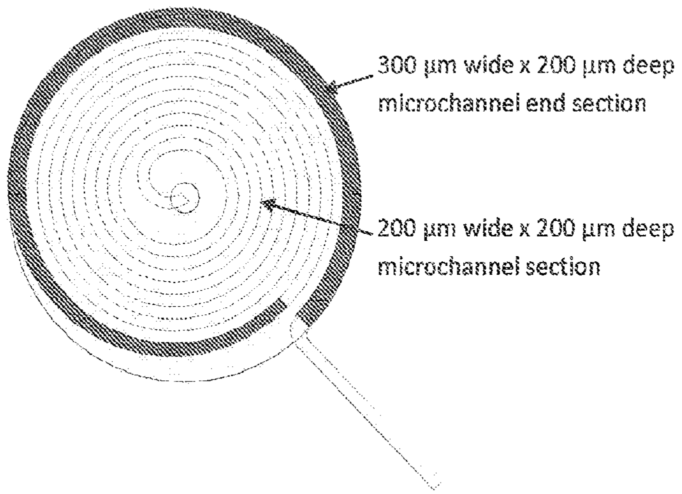

FIG 8A

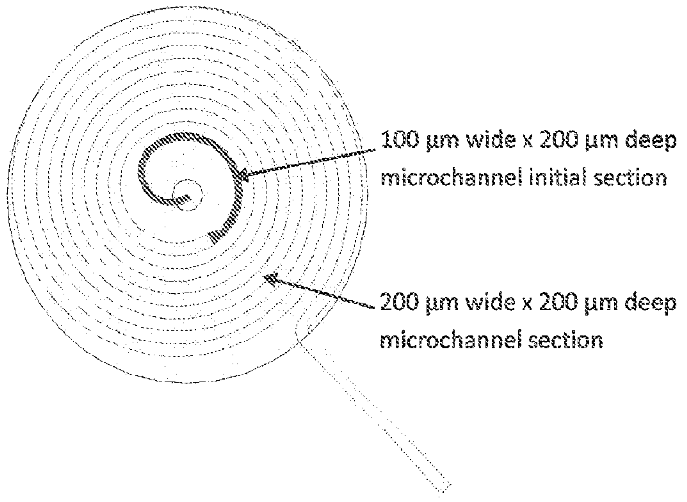

FIG 8B

FIG 8. Composite channel geometries to ensure that as liquid loss (due to evaporation) occurs, the liquid column will always retract from the outlet and the inlet position of the liquid column shall be maintained at the interface of the through-hole and the microchannel. Note that the values for the initial and end section are for illustrating the difference with the remainder of the microchannel and are not limited to stated values.

Effect of composite geometry on flow rate and evaporation loss rates

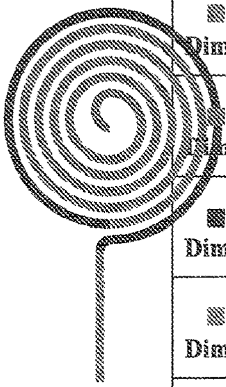

| | Configuration 1 | Configuration 2 | Configuration 3 | Configuration 4 |
|---|---|---|---|---|
| **A part Dimension** | 200 µm x 200 µm | 200 µm x 200 µm | 100 µm x 100 µm | 100 µm x 50 µm |
| **B part Dimension** | 200 µm x 200 µm | 200 µm x 200 µm | 200 µm x 200 µm | 200 µm x 200 µm |
| **C part Dimension** | 250 µm x 250 µm | 300 µm x 300 µm | 200 µm x 200 µm | 200 µm x 200 µm |
| **D part Dimension** | 400 µm x 400 µm | 400 µm x 400 µm | 400 µm x 400 µm | 400 µm x 400 µm |
| **Flow rate** | ~30 µL/min | ~30 µL/min | ~2.5 µL/min | ~0.3 µL/min |
| **Time for liquid loss in last ( ) loop** | >2 hrs | >2 hrs | ~8 hrs | Not tested |

FIG 9. Use of composite geometry in the microfluidic channel part of the microfluidic microplate configuration. The different colors in the spiral microfluidic channel figure represent different dimensions tested. As shown in the Table, increasing the end section size allows for high flow rate and significantly long times for loss of liquid in last loop due to evaporation. Note that when a larger end section is used the capillary forces at the inlet (at through hole interface) are higher ensuring that the liquid never "moves" from the inlet end during incubation periods. Also as shown in the Table, using a smaller dimension for the initial section allows for greatly reduced flow rates (longer residence times for liquid as it is flowing through the channel). The smaller initial section also exerts a higher capillary force ensuring liquid does not move from inlet end during incubation.

FIG 10A

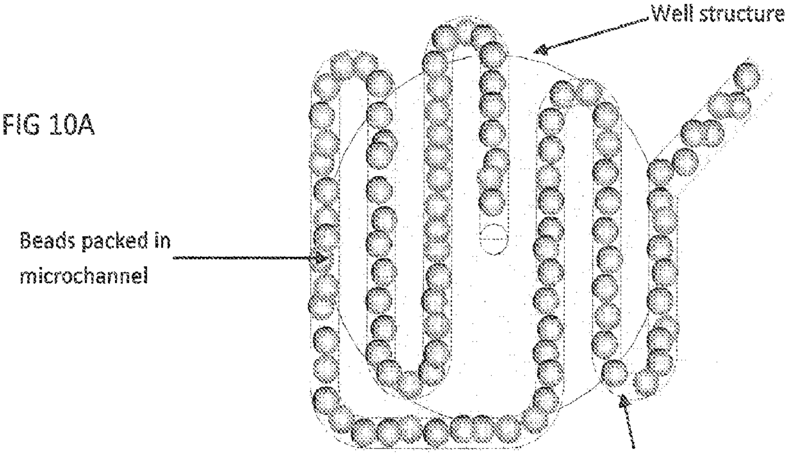

FIG 10B

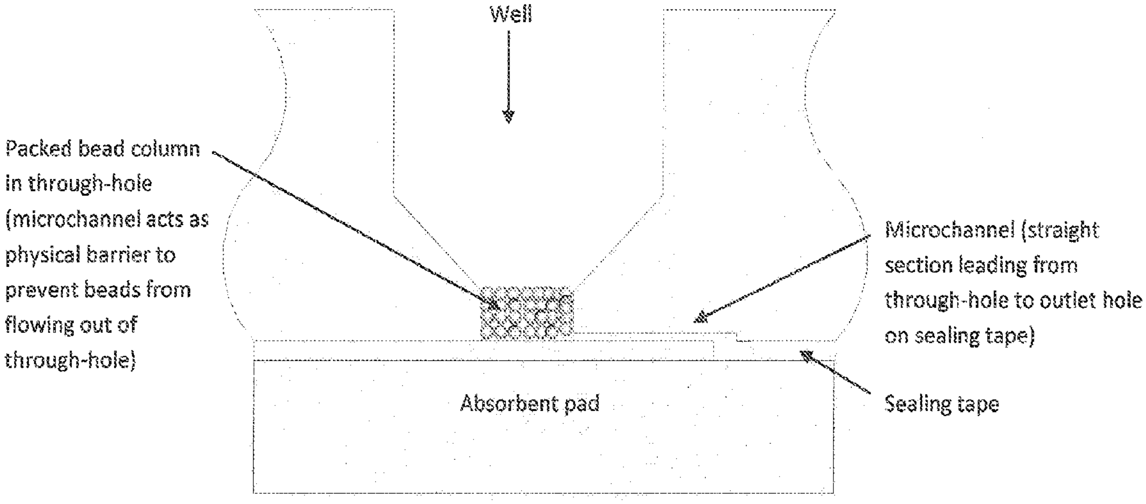

FIG 10. In FIG 10A, the microchannel is packed with microbeads; thereby even further increasing the surface area to volume ratio within the microchannel. In FIG 10B, the beads are packed only in the through hole structure and a simple channel configuration is used to draw the liquid away from the vertical line of sight of the through hole. In the configuration embodiment of FIG 10B, the packed bead array within the through hole acts as the reaction chamber. The through hole dimensions can be adjusted (since constraints described in FIG 4 no longer apply) to tune sensitivity.

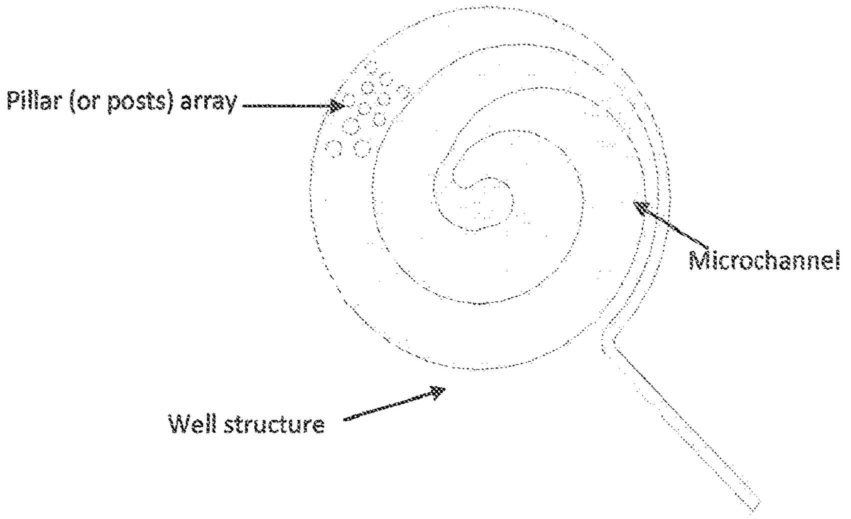
FIG 11. An array of pillars is fabricated in the channel path. If a solution containing cells is introduced in the well, it will be drawn into the microchannel and the solution will pass through while the cells will be trapped at the pillar array.

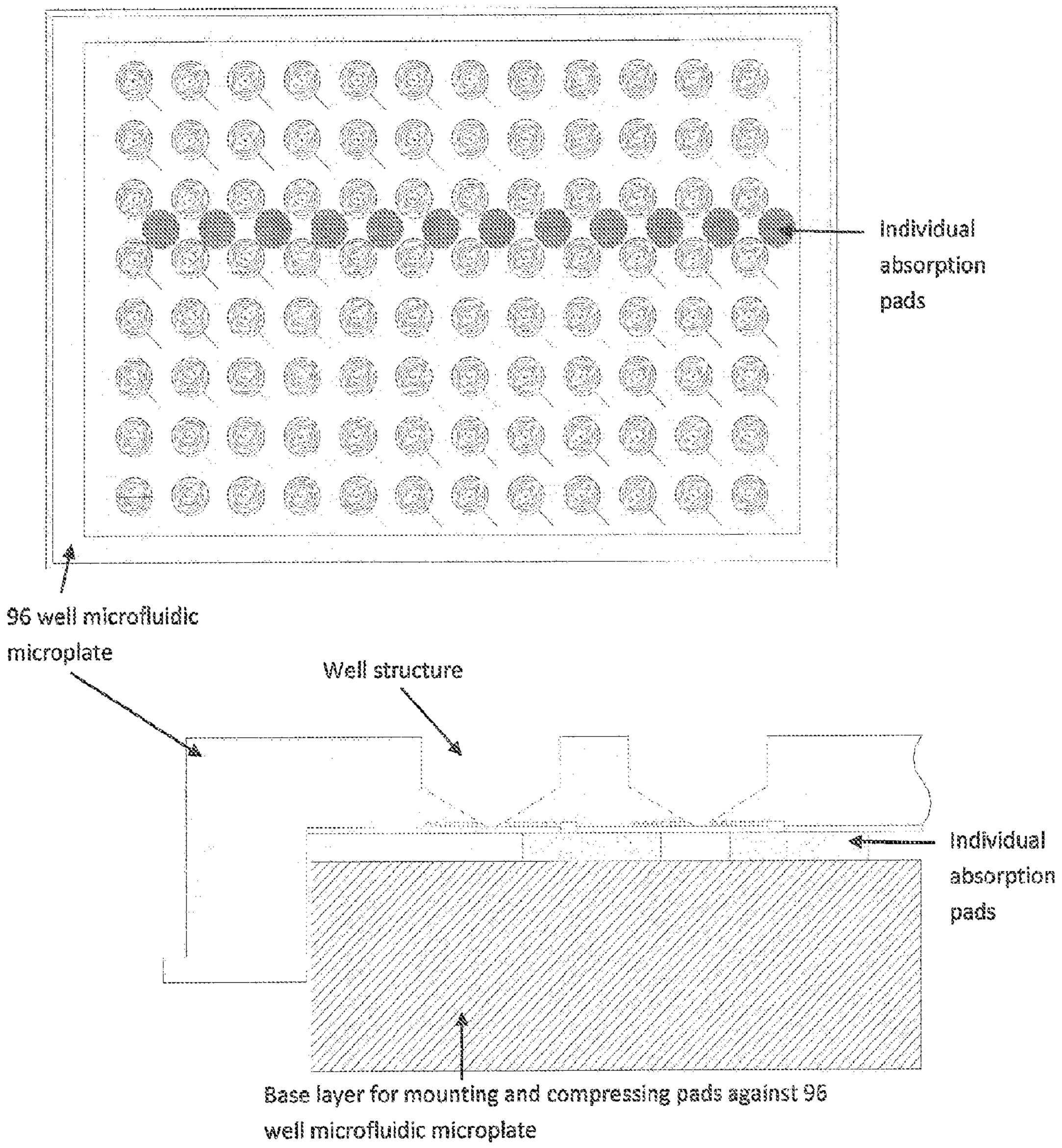

FIG 13. In this configuration, a separate absorption pad is used for each of the 96 wells. Furthermore, the absorptions pads are not physically attached to the microplate; instead they are attached to a base layer over which the microplate is positioned for operation. Furthermore, the pads are not in the same vertical line-of-sight as the wells and the microchannels. For ease of explanation, only one row of absorbent pads is shown; whereas the actual device would contain 96 distinct pads.

FIG 14A

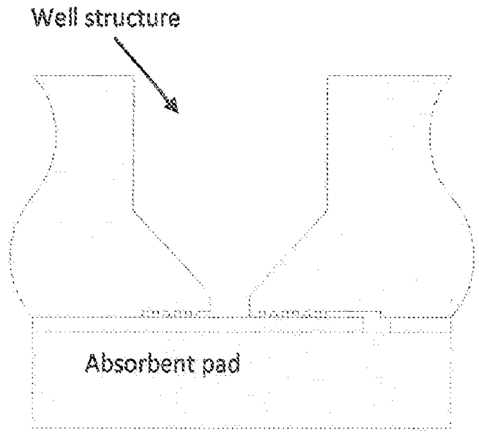

FIG 14B

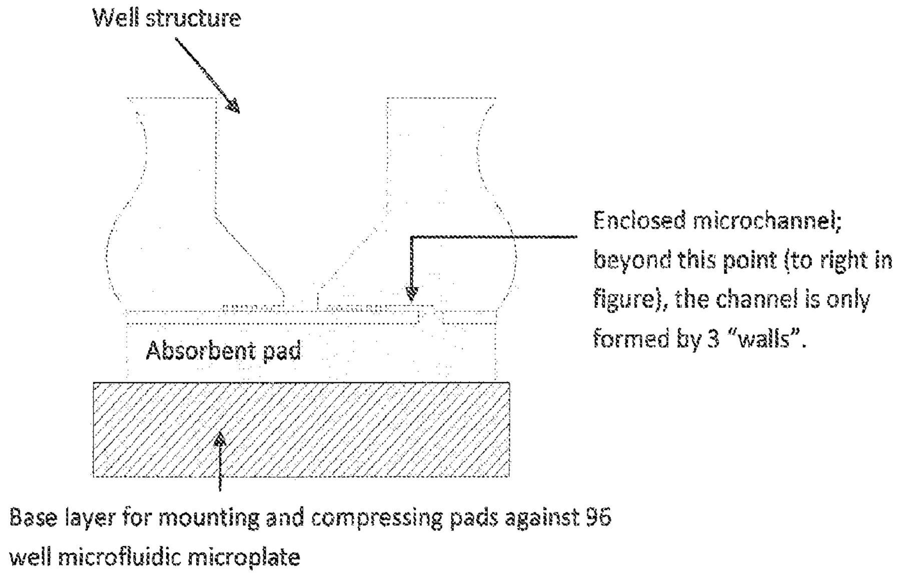

FIG 14. FIG 14A shows that when the absorbent pad is attached to the microplate (for example by using adhesives) the interface at the sealing tape is reasonably flat. When the absorbent pad is compressed by a base layer, the pad bulges into the hole at the sealing tape and is in close proximity (or makes physical contact) with the enclosed microchannel cross-section; as shown in FIG 14B. The latter ensures that the liquid easily contacts the absorbent layer. The absorbent pads can also be mounted on the base layer.

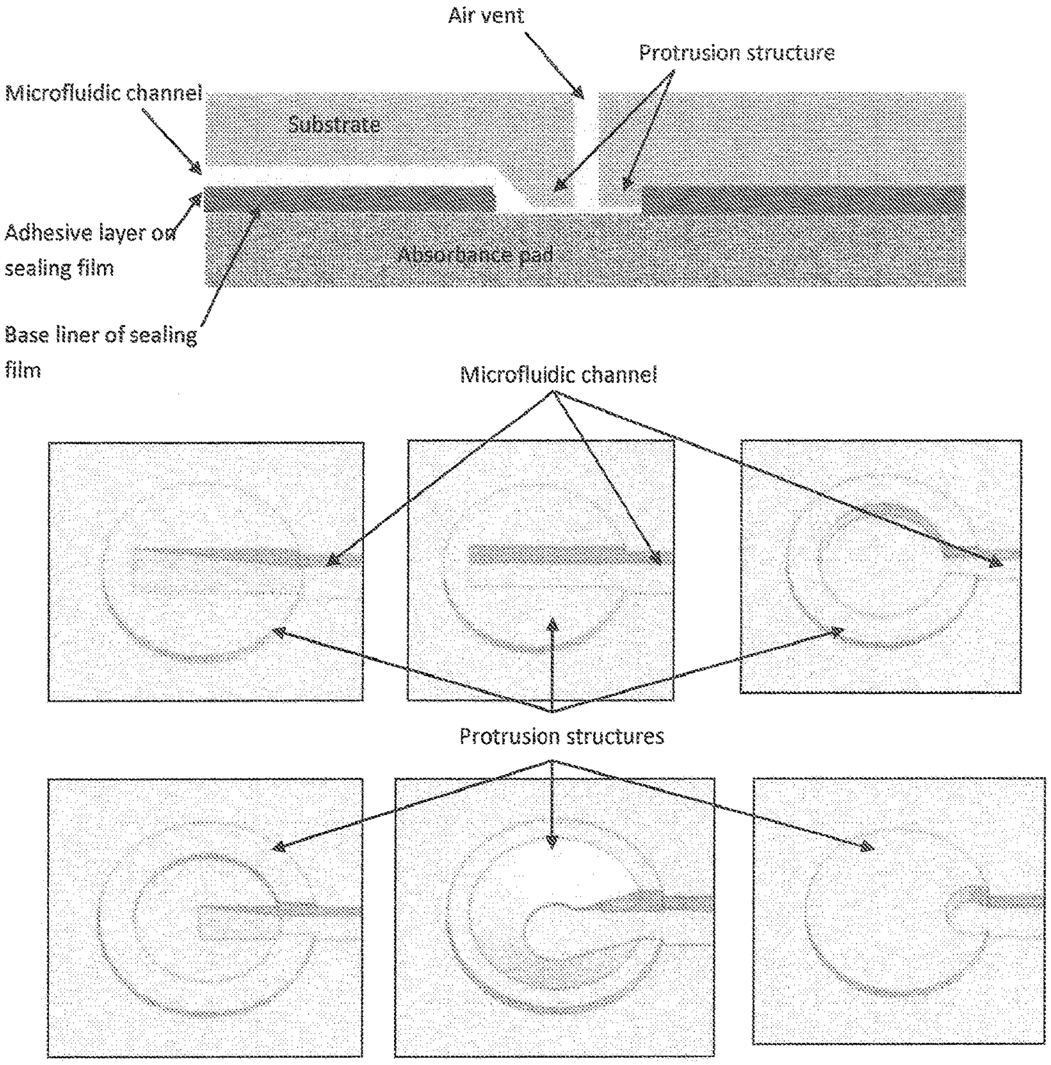

FIG 14C. Embodiment for contacting microfluidic channel with absorbent pad. Top figure shows schematic sketch illustrating the concept of the protrusion structure at the end of the microfluidic channel. Figures at bottom (series of 6 images) show 3D illustrations of different embodiments of the protrusion structure and the end of the microfluidic channel. Please note that in the 3D images; the protrusion is directed upwards whereas the schematic sketch on the top shows it directed towards the bottom.

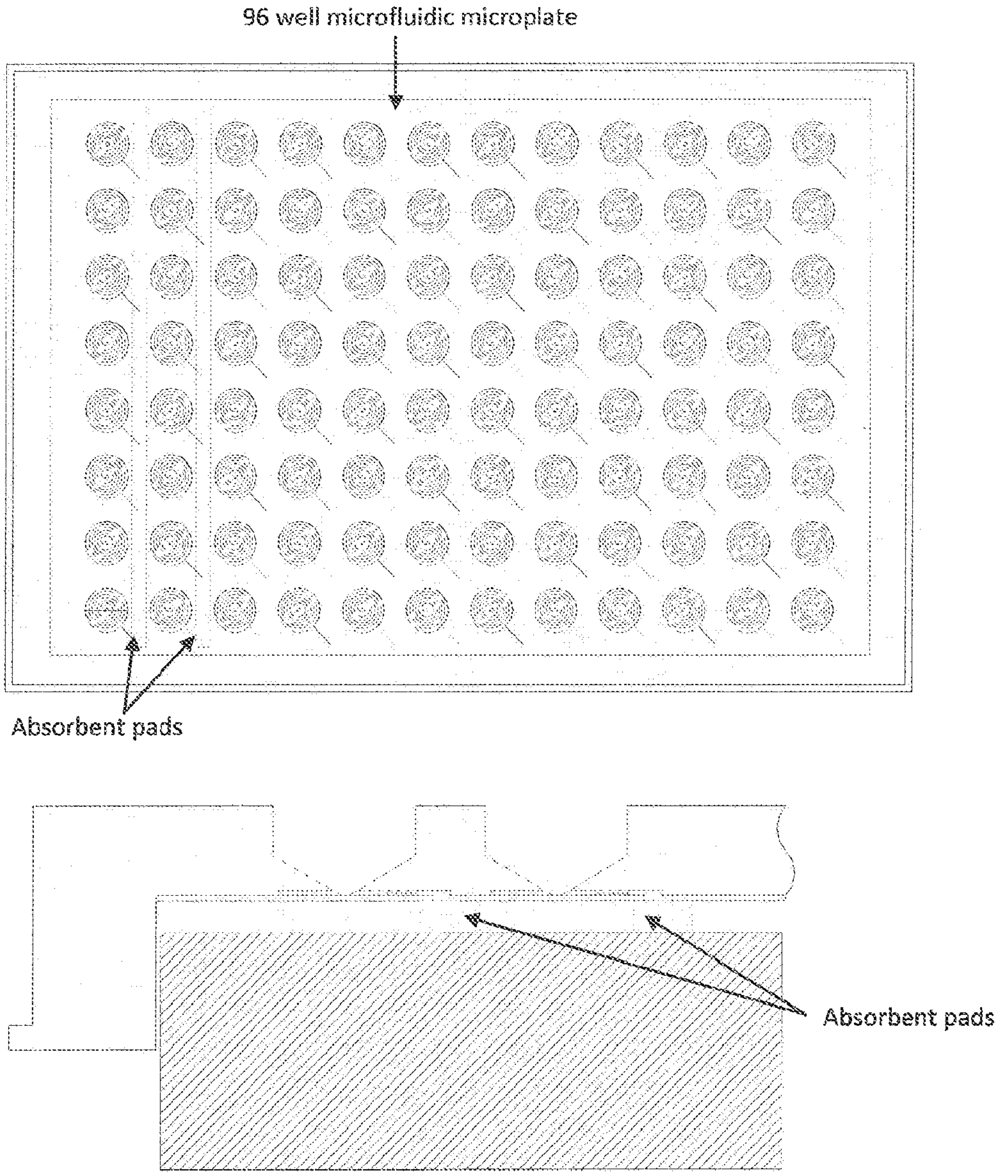
FIG 15. In this configuration, the absorbent pads are designed as strips that are connected to each column (or each row). Furthermore, the pads are not in the same vertical line-of-sight as the wells and the microchannels. For ease of explanation, only two columns of absorbent pads are shown; whereas the actual device would contain 12 distinct columns (or 8 distinct rows).

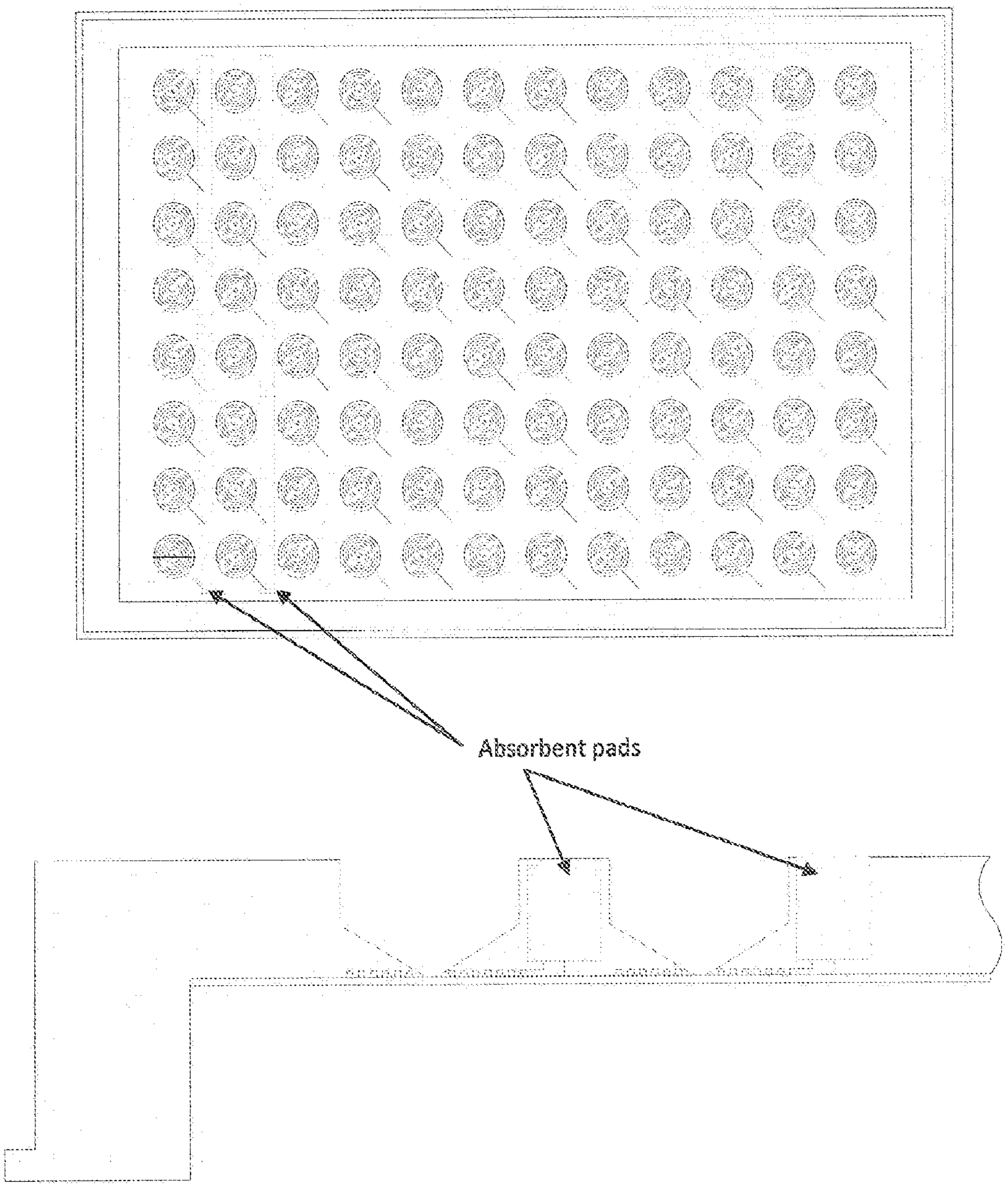

FIG 16. In this configuration, the absorbent pads are designed as strips that are connected to each column (or each row) from the top side. Furthermore, the pads are not in the same vertical line-of-sight as the wells and the microchannels. . For ease of explanation, only two columns of absorbent pads are shown; whereas the actual device would contain 12 distinct columns (or 8 distinct rows).

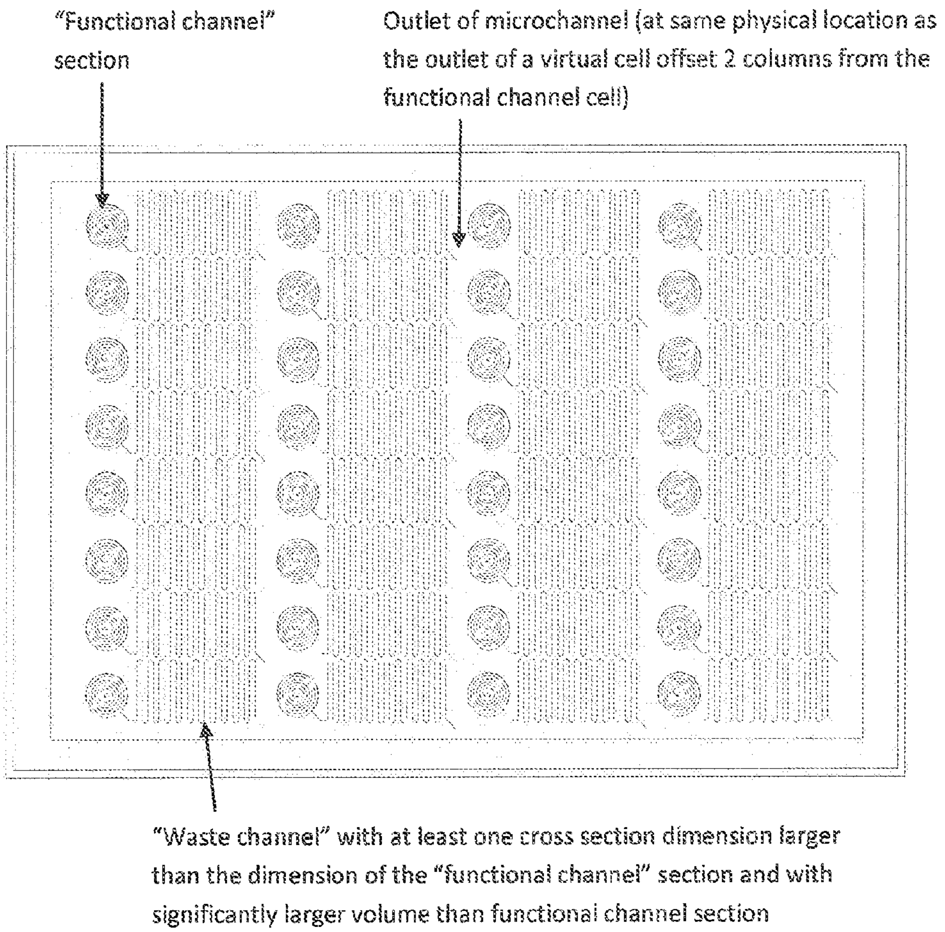

FIG 17. In this embodiment, the microfluidic microplate uses an additional length of the microchannel as the capillary pump to replace the absorbent pad, reducing the plate configuration to only two layers; namely the substrate (with well, through-hole, and microchannel) and the sealing layer. The amount of total liquid that can be added per well in this embodiment is limited by the volume of the "waste" channel section. The embodiment shown in FIG 17 illustrates an in-plane waste microchannel; whereas the same effect can also be achieved by a through hole acting as a waste reservoir as explained in the disclosure.

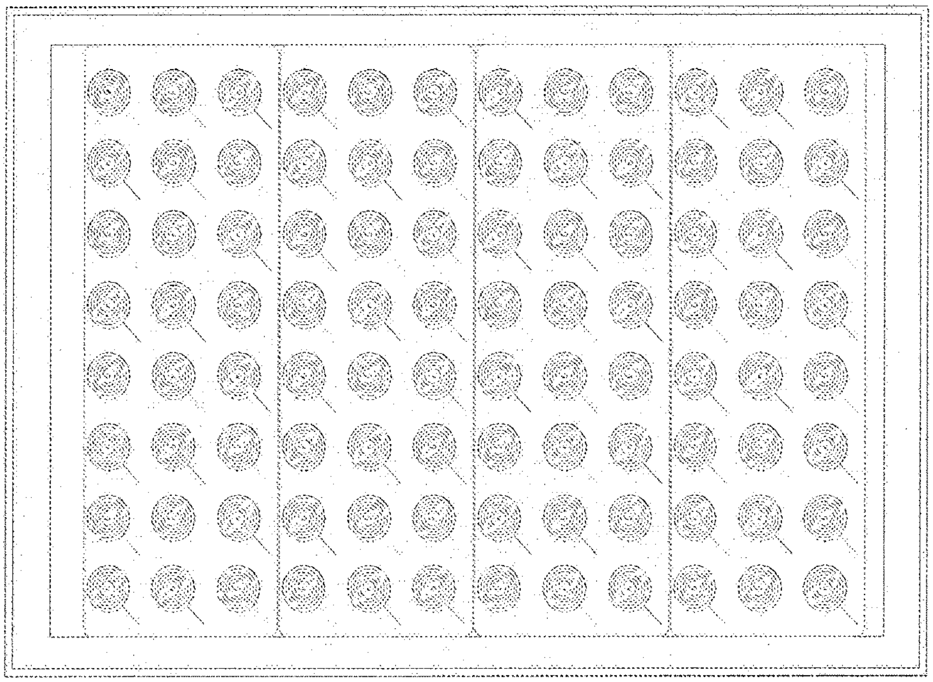

FIG 20. In this configuration, the microfluidic channels and wells are fabricated on multiple separate substrate which are then positioned onto an enclosure matching the shape of a conventional 96 well plate. In FIG 20, one configuration embodiment is shown wherein each of the individual substrate is approximately the size of a conventional glass plate (approximately 25 mm x 75 mm).

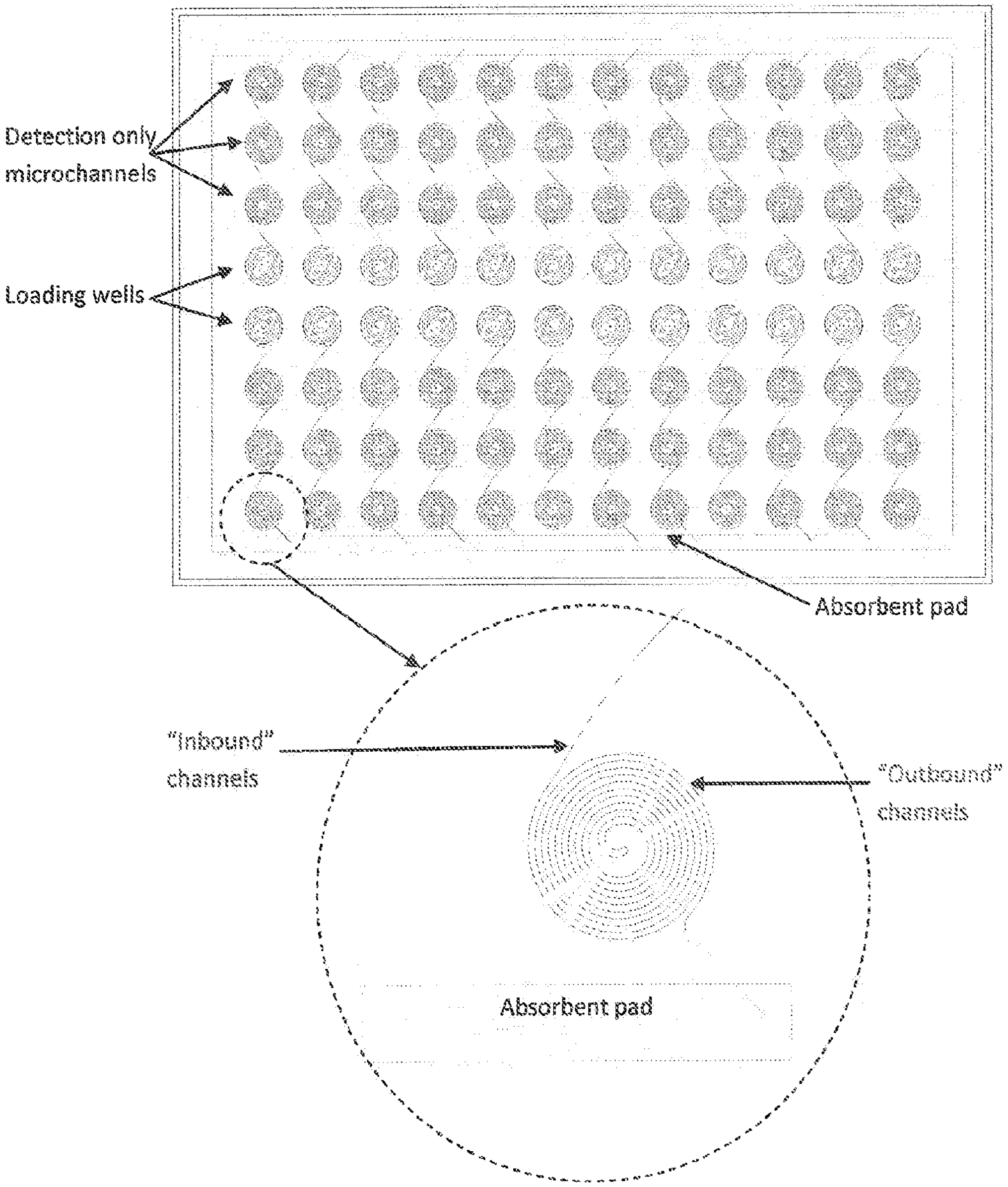

FIG 21A. In this configuration, one loading well is connected to a microchannel path on the opposing surface and is additionally connected to other microchannel sections not directly underneath the loading well. When a liquid is loaded into the well, it will flow through all the microchannel sections (4 sections in fig above) connected in series. In the Figure shown above, a total of 24 distinct loading wells connect to a total of 4 reaction chambers each. The microchannel configuration may be modified to another embodiment to accommodate the series connection of the channel sections.

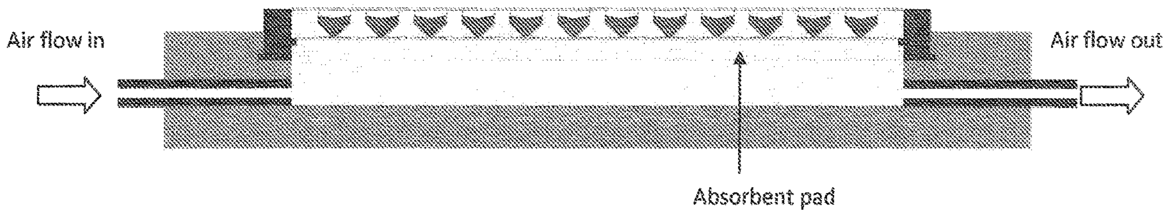

FIG 22. In this configuration, particularly well suited for applications wherein a slow flow rate is desired for a long interval; the microplate is mounted in a special fixture. The fixture is connected to an air pump that can pump air at room temperature or elevated temperatures through the fixture which passes on the underside of the absorbent pad. The flow sequence is designed such that prior to the step where a low, steady flow rate for a extended duration is desired, a high volume of liquid is added to completely saturate the pad such that it cannot absorb any further liquid. Then the desired liquid is added to the wells and the wells are sealed on top to prevent evaporative loss. Furthermore, air flow is initiated in the fixture which will cause evaporative loss of liquid from the pad. As the pad loses liquid volume, additional liquid volume will be drawn from the wells at a low flow rate for an extended period of time. The absorbent pad may be a common pad for all wells or separate pads for each well.

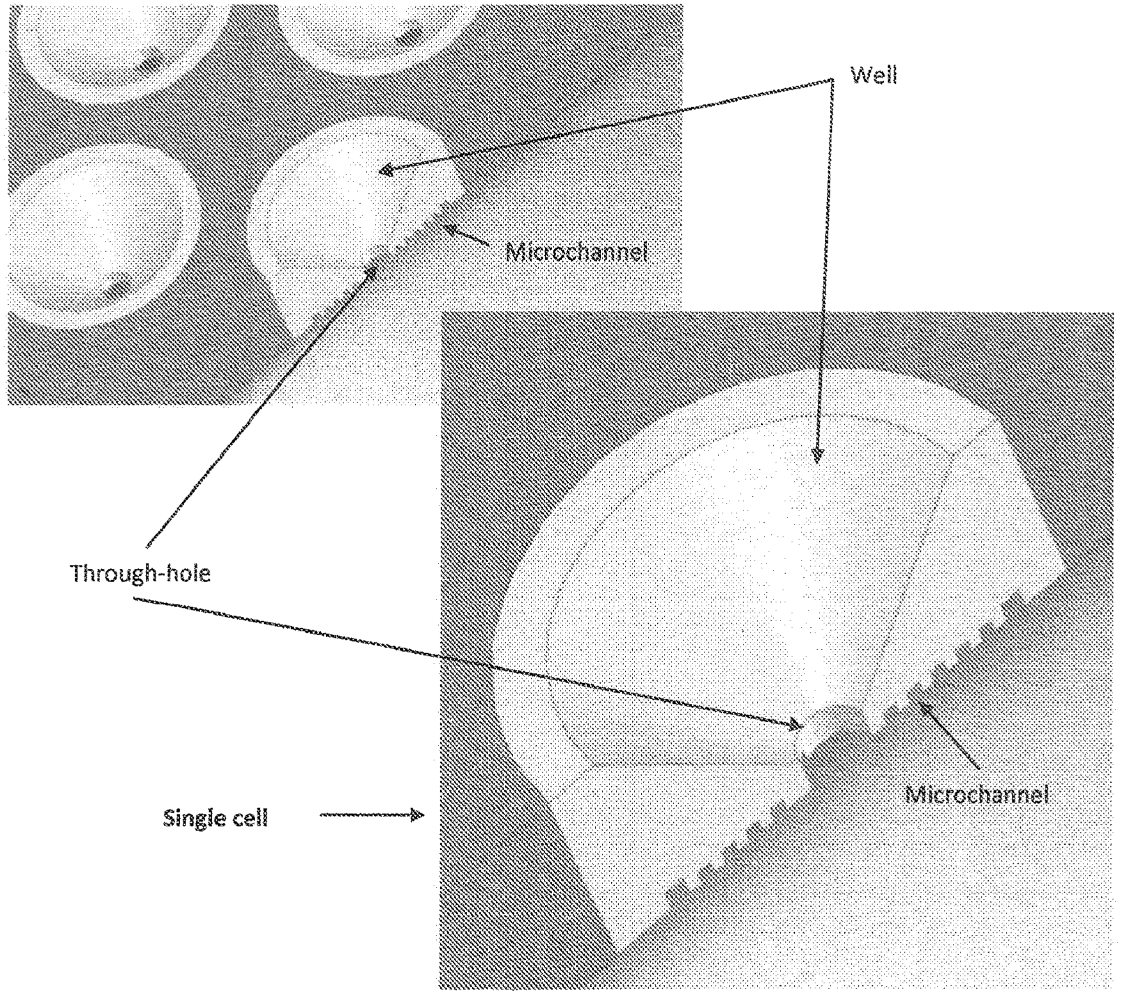

FIG 23. Embodiment particularly well suited for chemiluminescence based detection (note that only a partial view of the microfluidic microplate is shown in the above FIG to illustrate the concept clearly). In this embodiment, each cell (wherein a cell composes of one well with a through-hole connecting to a single microchannel) is physically isolated from the adjoining cells by a substantially opaque substrate. The "microfluidic substrate" is in actuality an array of physically distinct substrates.

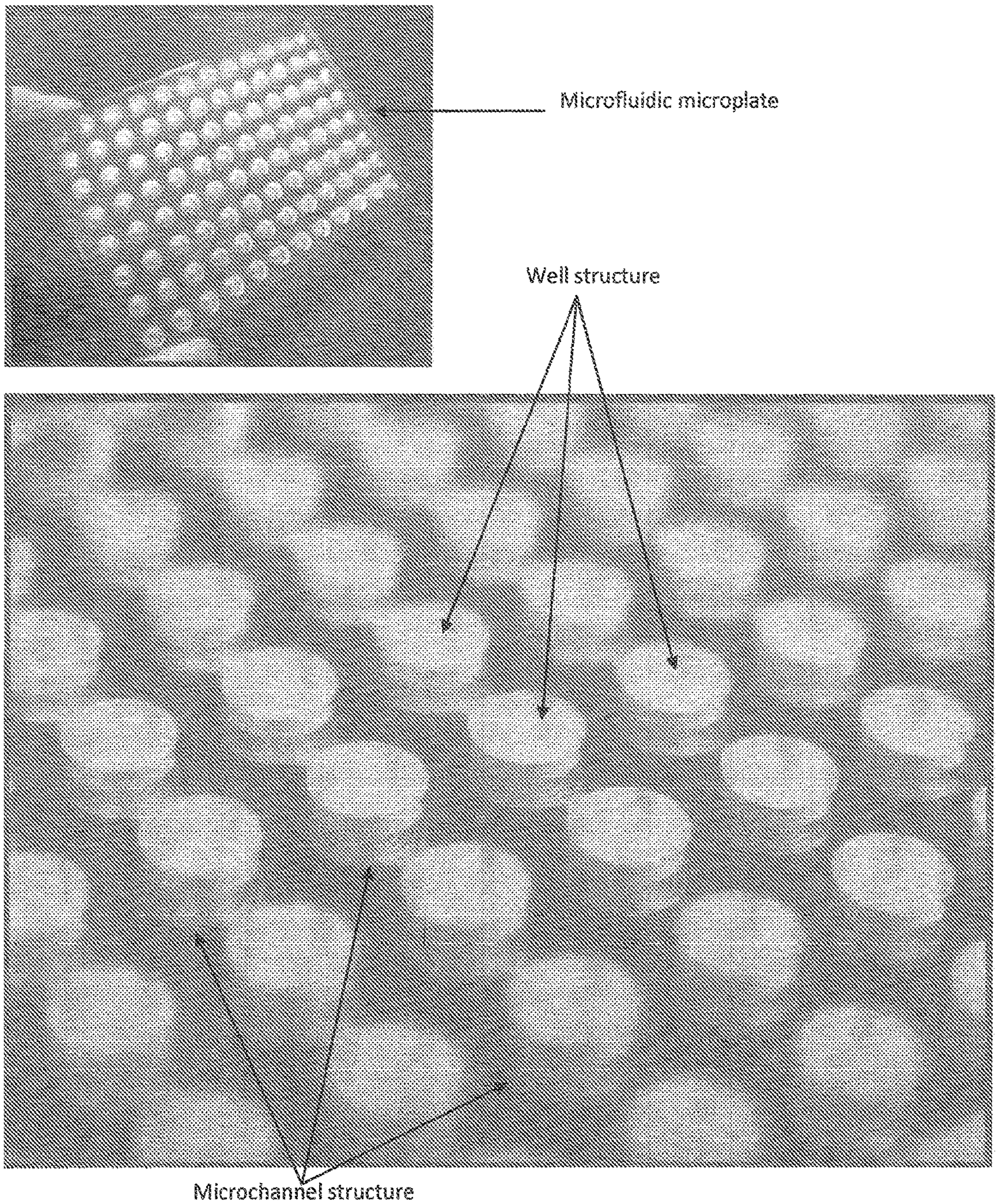
FIG 25. Microfluidic microplate. Note sealing tape and absorbent pad are not shown for clarity.

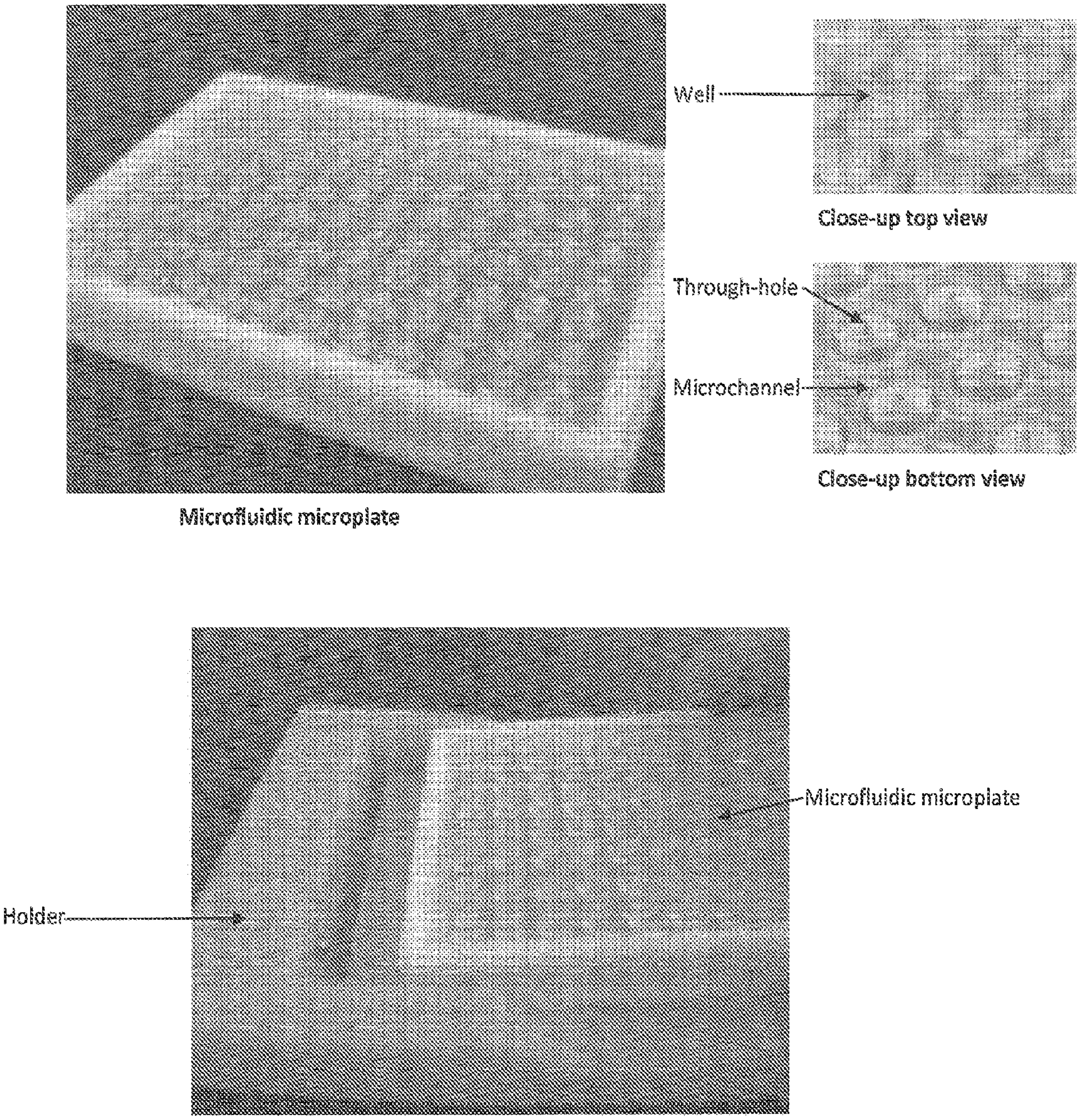

FIG 26. Alternate embodiment of the Microfluidic microplate of the invention. Note sealing tape and absorbent pad are not shown for clarity. The image on the bottom shows the microfluidic microplate being positioned in a holder for liquid handling steps -- in actual operation; the holder would also house the absorbent pad in the embodiments wherein the pad is a disposable element.

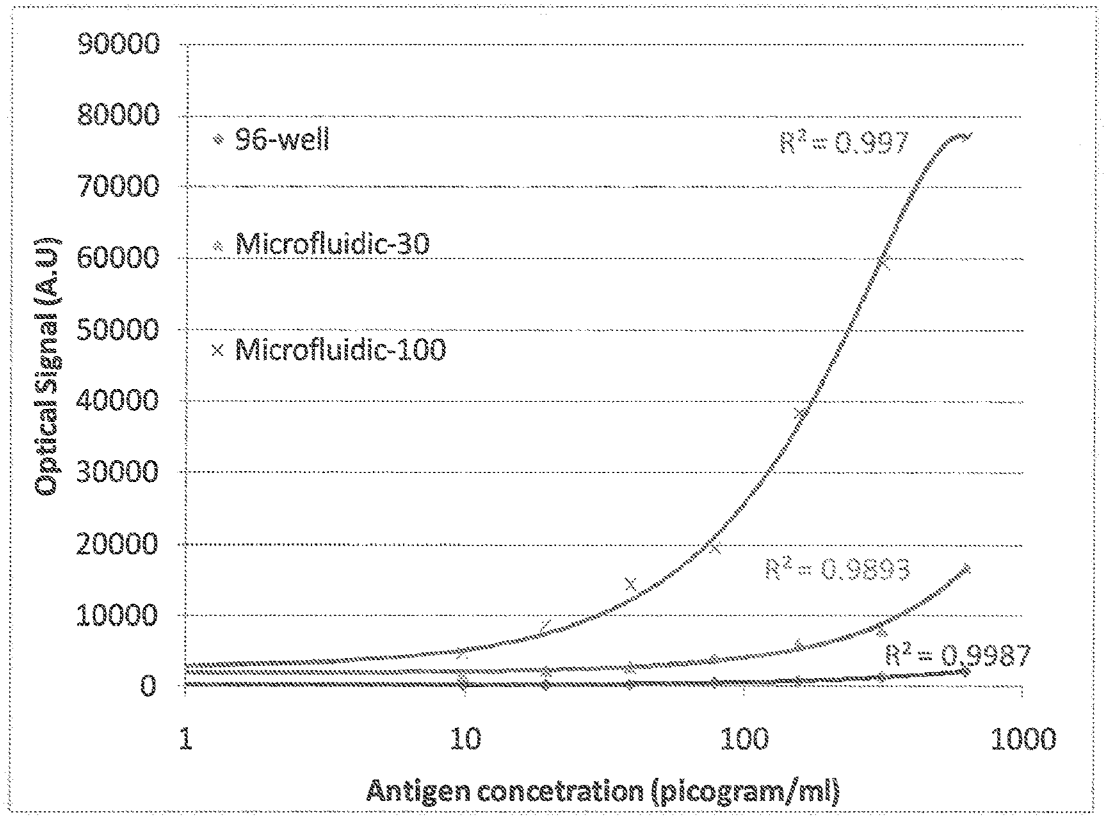

FIG 27. Test results comparing the performance of a conventional (traditional 96-well plate) 96 well plate with the microfluidic microplate of the invention using chemifluorescence based detection. Data illustrates advantage of the flow-through mode. When a 30 µl sample volume is used in the microfluidic microplate (Microfluidic-30 curve), the signal is similar to a 96-well plate using 100 µl sample. When a 100 µl sample volume is used in the microfluidic microplate (Microfluidic-100) the sensitivity of the microfluidic microplate is >10x improved. This is owing to the fact that as the sample continues to flow past the capture antibody (conjugated to channel walls) a progressively larger fraction is bound to the capture antibody with increased sample volume. This leads to increased surface density of the antigen which allows for more detection antibodies to bind within the channel and generate a higher signal.

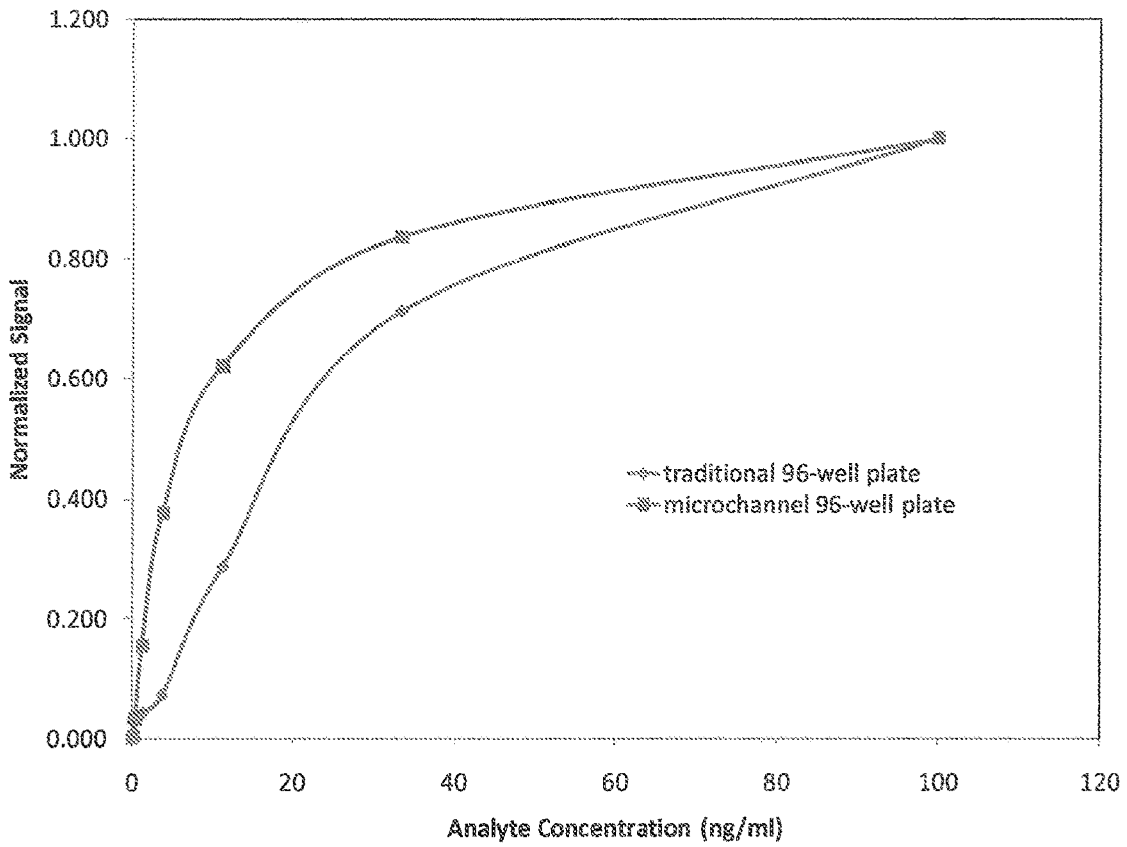
FIG 28. Test results comparing the performance of a conventional (traditional 96-well plate) 96 well plate with the microfluidic microplate of the present invention using chemiluminescence based detection. The Y-axis is normalized to facilitate comparison.

MICROFLUIDIC ASSAY PLATFORMS

CROSS REFERENCE TO RELATED APPLICATIONS

This application claims priority to U.S. Provisional Application No. 61/226,764, filed Jul. 20, 2009 and U.S. Provisional Application No. 61/297,221, filed Jan. 21, 2010, each of which are incorporated by reference in their entirety.

GOVERNMENT RIGHTS

This work was partially funded by the National Institutes of Health (NIH) under Grant number R44EB007114. The government may have certain rights to this invention.

FIELD OF THE INVENTION

This invention relates to improvements to microplate assays, and more particularly to the integration of microfluidic technology with conventional microplate architectures to improve the performance of the microplates and assays performed thereon.

BACKGROUND OF THE INVENTION

Immunoassay techniques are widely used for a variety of applications, such as described in "Quantitative Immunoassay: A Practical Guide for Assay Establishment, Troubleshooting and Clinical Applications; James Wu; AACC Press; 2000". The most common immunoassay techniques are non-competitive assays, an example of such is the widely known sandwich immunoassay wherein two binding agents are used to detect an analyte, and competitive assays wherein only one binding agent is required to detect an analyte In its most basic form, the sandwich immunoassay (assay) can be described as follows: a capture antibody, as a first binding agent, is coated (typically) on a solid-phase support. The capture antibody is selected such that it offers a specific affinity to the analyte and ideally does not react with any other analytes. Following this step, a solution containing the target analyte is introduced over this area whereby the target analyte conjugates with the capture antibody. After washing the excess analyte away, a second detection antibody, as a second binding agent, is added to this area. The detection antibody also offers a specific affinity to the analyte and ideally does not react with any other analytes. Furthermore, the detection antibody is typically "labeled" with a reporter agent. The reporter agent is designed to be detectable by one of many detection techniques such as optical (fluorescence or chemiluminescence or large-area imaging), electrical, magnetic or other means. In the assay sequence, the detection antibody further binds with the analyte-capture antibody complex. After removing the excess detection antibody; finally the reporter agent on the detection antibody is interrogated by means of a suitable technique. In this format, the signal from the reporter agent is proportional to the concentration of the analyte within the sample. In the so called "competitive" assay, a competing reaction between detection antibody and (detection antibody+analyte) conjugate is caused. The analyte, or analyte analogue is directly coated on the solid phase and the amount of detection antibody linking to the solid-phase analyte (or analogue) is proportional to the relative concentrations of the detection antibody and the free analyte in solution. An advantage of the immunoassay technique is the specificity of detection towards the target analyte offered by the use of binding agents.

Note that the above description applies to most common forms of the assay technique—such as for detection of proteins. Immunoassay techniques can also be used to detect other analytes of interest such as, but not limited to, enzymes, nucleic acids and more. Similar concepts have also been widely applied for other variations as well including in cases; detection of an analyte antibody using a "capture" antigen and a detection analyte.

The 96 well microtiter plate, also referred to as "microplate", "96 well plate", "96 well microplate"; has been the workhorse of the biochemical laboratory. Microplates have been used for a wide variety of applications including immunoassay (assay) based detections. Other applications of microplates include use as a medium for storage; for cellular analysis; for compound screening to name a few. The 96 well plate is now ubiquitous in all biochemistry labs and a considerable degree of instrumentation such as automated dispensing systems, automated plate washing systems have been developed. In fact the Society for Biomolecular Sciences (SBS) and American National Standards Institute (ANSI) have published guidelines for certain dimensions of the microplate—and most manufacturers follow them to harmonize the instrumentation systems that can handle these plates. In addition to the basic automated instruments described above, there are numerous examples of specific instrumentation systems developed to improve a specific aspect of the microplate performance. For instance, patents such as U.S. Pat. No. 7,488,451; incorporated in its entirety by reference herein, discloses a dispensing system for microparticles wherein the system is targeted for loading microparticles in microplates; whereas U.S. Pat. No. 5,234,665; incorporated in its entirety by reference herein, discloses a method of analyzing the aggregation patterns in a microplate for cellular analysis.

The 96 well platforms, although very well established and commonly accepted suffers from a few notable drawbacks. Each reaction steps requires approximately 50 to 100 microliter of reagent volume; and each incubation step requires approximately 1 to 8 hours of incubation interval to achieve satisfactory response; wherein the incubation time is usually governed by the concentration of the reagent in the particular step. In an attempt to increase the yield per plate, and reduce reaction volumes (and consequently operating cost per plate); researchers have developed increasing density formats such as the 384 and 1536 well microplates. These have the same footprint of a 96 well but with a different well density and well-to-well spacing. For instance, typical 1536 wells require only 2-5 microliter of reagent per assay step. Although offering tremendous savings in reagent volumes, the 1536 well plate suffers from reproducibility issues since the ultra small volume can easily evaporate thereby altering the net concentrations for the assay reactions. 1536 well plate are usually handled by dedicated robotic systems in the so called "High throughput screening" (HTS) approach. In fact, there are innovative examples where researchers have even further extended the plate "density" (i.e. number of wells in the given area) as disclosed in published patent application WO05028110B1; incorporated in its entirety by reference herein, wherein an array of approximately 6144 wells is created to handles nanoliter sized fluid volumes. This of course, also requires dedicated instrumentation systems as disclosed in a related patent, U.S. Pat. No. 7,407,630, incorporated in its entirety by reference herein. Researchers have invested tremendous energies into modifying microplate architectures; most often within the confines of the SBS/ANSI guidelines; to develop novel designs. One example of this is disclosed in patent including U.S. Pat. No. 7,033,819, U.S. Pat. No. 6,699,665 and U.S. Pat. No. 6,864,065; all incorporated in their entirety by reference herein, wherein a secondary array of micron sized wells is created at the bottom of the well of a conventional 96 well microplate. These miniature wells are used to entrap cells and study their motility patterns amongst other analyses possible with this format. Flexibility in handling the microplates by selectively attaching and detaching the bottoms of the wells is explained in U.S. Pat. No. 7,371,563 and related application U.S. Pat. No. 6,803,205; both incorporated in their entirety by reference herein. U.S. Pat. No. 7,138,270 and WO03059518A3; both incorporated in their entirety by reference herein, disclose a technique wherein the same footprint and well layout of a 96 well plate is used but with significantly reduced volumes per plate. Advanced functionality as use of integrated packed columns for filtering and/or extraction has also been demonstrated for example by U.S. Pat. No. 7,374,724; incorporated in its entirety by reference herein. Researchers have also integrated membranes at the base of microplates for (a) filtration and (b) through flow assay applications as disclosed in US20040247490A1; incorporated in its entirety by reference herein. For the through flow applications, the small pore size of the membrane filters requires a fairly robust displacement force to remove the liquids from the membrane.

The next step in miniaturization and automation has been the development of microfluidic systems. Microfluidic systems are ideally suited for assay based reactions as disclosed in U.S. Pat. No. 6,429,025, U.S. Pat. No. 6,620,625 and U.S. Pat. No. 6,881,312; all incorporated in their entirety by reference herein. In addition to assay based analysis, microfluidic systems have also been used to study the science of the assays; for example US20080247907A1 and WO2007120515A1; both incorporated in their entirety by reference herein, describe methods to study the kinetics of an assay reaction. Microfluidic systems have also been demonstrated for applications such as cell handling and cellular based analysis as described in U.S. Pat. No. 7,534,331, U.S. Pat. No. 7,326,563 and U.S. Pat. No. 6,900,021; all incorporated in their entirety by reference herein, amongst others. The key advantage of microfluidic systems has been their ability to perform massively parallel reactions with high throughput and very low reaction volumes. Examples of this are disclosed in U.S. Pat. No. 7,143,785, U.S. Pat. No. 7,413,712 and U.S. Pat. No. 7,476,363; all incorporated in their entirety by reference herein. Instrumentation systems specific for high throughput microfluidics have also been extensively studied and developed as disclosed in US20020006359A1, U.S. Pat. No. 6,495,369, and US20060263241A1; all incorporated in their entirety by reference herein. At the same time, a key problem that is still not completely resolved in the issue of world-to-chip interface for microfluidic system. Researchers have usually developed customized solutions for this problem, on example of which is disclosed in U.S. Pat. No. 6,951,632; incorporated in its entirety by reference herein, depending on the application. This single issue has been a significant bottleneck in widespread adoption of microfluidics. Another problem with widespread adoption of microfluidics has been the lack of standardized platforms. Most often microfluidic devices have specific layout that is well suited for the given application but results in fluidic inlet and outlets positioned at different locations. Indeed, there is little if any commonality even in the footprint or thickness of a microfluidic device that is commonly accepted in the art.

The next logical step in this sequence is naturally the integration of microfluidic systems with the standardized 96 or 384 or 1536 well layout. Most often, even though the "microfluidic" microplates use the same footprint as a conventional microplate; the functionality is very specific as disclosed by examples in US20060029524A1 and U.S. Pat. No. 7,476,510; both incorporated in their entirety by reference herein, for cellular analysis. Researchers have extensively used the standard microplate format as a template to build microfluidic devices. Examples of this abound in the literature as seen by the works of Witek and Park et al., "96-Well Polycarbonate-Based Microfluidic Titer Plate for High-Throughput Purification of DNA and RNA," Anal. Chem., 2008, 80 (9), pp 3483-3491, and "A titer plate-based polymer microfluidic platform for high throughput nucleic acid purification," Biomedical Microdevices; Volume 10, Number 1/February, 2008; 21-33; and "A 96-well SPRI reactor in a photo-activated polycarbonate (PPC) microfluidic chip," Micro Electro Mechanical Systems, 2007. MEMS. IEEE 20th International Conference on, 21-25 Jan. 2007 Page(s):433-436; and the work of Choi et al "A 96-well microplate incorporating a replica molded microfluidic network integrated with photonic crystal biosensors for high throughput kinetic; biomolecular interaction analysis," Lab Chip, 2007, 7, 1-8, and further in works of Tolan et al., "Merging Microfluidics with Microtitre Technology for More Efficient Drug Discovery," JALA, Volume 13, Issue 5, Pages 275-279 (October 2008); and even further in work of Joo et al "Development of a microplate reader compatible microfluidic device for enzyme assay," Sensors and actuators. B, Chemical; 2005, vol. 107, no 2, pp. 980-985. Specifically for cell based assays; a microfluidic configuration with the same footprint as a microplate is described by Lee et al, "Microfluidic System for Automated Cell-Based Assays," Journal of the Association for Laboratory Automation, Volume 12, Issue 6, Pages 363-367; and even offered as a commercial product by CellAsic (http://www-.cellasic.com/M2.html): All of these are examples of microfluidic devices which are built on the same footprint as of a 96 (or 384) well plate yet do not exploit the full density of the plate.

U.S. Pat. No. 6,742,661 and US20040229378A1; both incorporated in their entirety by reference herein, discloses an exemplary example of the integration of the 96 well architecture with a microfluidic channel network. As described in U.S. Pat. No. 6,742,661 in the preferred embodiment, an array of wells is connected via through-hole ports to a microfluidic circuit. In the preferred embodiment, the microfluidic circuit may be a H or T type diffusion device. U.S. Pat. No. 6,742,661 also describes means for controlling the movement of liquids within this device. The device uses a combination of hydrostatic and capillary forces to accomplish liquid transfer. As explained in greater detail in U.S. Pat. No. 6,742,661, the hydrostatic forces can be controlled by (a) either adding extra thickness to the microplate structure by stacking additional well layers or (b) by supplementing the existing hydrostatic force with external pump driven pressures. U.S. Pat. No. 6,742,661 primarily uses hydrostatic forces (modulated using either of above methods) wherein there is a difference in the hydrostatic forces between the different inlets to a microfluidic circuit. Specifically, the difference in hydrostatic pressure is envisioned as caused by a difference in heights (or depths) of the liquid columns in the wells connected to the different inlets of the microfluidic circuit. The device concepts illustrated in U.S. Pat. No. 6,742,661 are certainly an innovative solution to integrating the Laminar Flow Diffusion Interface (LFDI) type microfluidic devices with a 96 well architecture. However, U.S. Pat. No. 6,742,661 only envisions a self-contained fluidic flow pattern originating from and terminating into wells of the disclosed device. Furthermore, the flow control techniques described in U.S. Pat. No. 6,742,661 fall under the broad category of "pressure driven" flows wherein the hydrostatic pressure of the liquid column controls the flow characteristics. Most importantly, U.S. Pat. No. 6,742,661 does not envision the use of a single channel transferring the liquid from a well structure to a drain structure without any additional connections to or from the microfluidic channel as envisioned in this invention. U.S. Pat. No. 6,742,661 materially and distinctly differs from the present invention in these above listed respect.

US20030049862A1; incorporated in its entirety by reference herein, is another exemplary example of attempts to integrate microfluidics with the standard 96 well configuration. It is very important to note that US20030049862A1 defines "microfluidics" in a slightly different manner than conventionally accepted. As defined in US20030049862A1 "Unlike current technologies that position fluidic channels in the fluidic substrate or plate itself the present invention locates fluidic channels in each of the fluidic modules". This is achieved by inserting an appropriately sized cylindrical insert into a nominally matching cylindrical well of a microplate. By ensuring a consistent gap between the top surface of the inserted cylinder and the bottom surface of the well; a "microchannel" is defined. Furthermore, the configuration of the device disclosed in US20030049862A1 is inherently dependent on external flow control; whether by automatic means such as by use of micropumps or by manual means such as be use of a pipette. US20030049862A1 significantly differs from the present invention in respect of (a) means of defining a microchannel structure and (b) means of fluidic movement control. The structure and device disclosed in the present invention is a simple flow through configuration that does not require any external flow controls.

US20030224531A1; incorporated in its entirety by reference herein, also discloses an example of coupling microfluidics to well structures (including those with standard layouts of 96, 384, 1536 well plates) for electrospray applications. US20030224531A1 uses an array of reagent wells coupled to another array of shallow process zones; of a depth of a micron or even submicron dimensions; wherein the process zones are connected to the reagent wells at one end and to a electrospray emitter tip at the other end. The force for fluidic movement (motive force as defined in US20030224531A1) is provided preferably by an electric potential across the fluid column or also by a pressure differential across the column; which is significant difference from the present invention wherein the fluid movement is purely by capillary forces. The connection to the process zones may be via inlet and outlet microchannels wherein the microchannels are configured to provide additional functionality (such as labeling or purification). The key difference between US20030224531A1 and the present invention is that US20030224531A1 uses the (wells+microfluidics) structure essentially as a sample treatment method for final analysis by a mass spectrometer. In the preferred embodiment, the present invention describes the uses of a microchannel geometry substantially in the same position on opposing faces of a substrate as the loading well; and furthermore, whereby the microchannels form a reaction chamber to expedite the reactions that would also occur within the loading wells; and furthermore where the reaction signal is only interrogated by optical means by readers that can also interrogate conventional 96 well plates.

WO03089137A1; incorporated in its entirety by reference herein, discloses yet another innovative method for increasing the throughput of a 96 well plate. In this invention, the assays are performed within nanometer sized channels within a metal oxide, preferably aluminum oxide, substrate. As disclosed in WO03089137A1, each individual well has a metal oxide membrane substrate attached to the bottom. During operation, each well is individually sealed and a vacuum (or pressure) is applied from a common source, which forces the liquid within the well to be drawn towards the bottom (or away from bottom) of the substrate. Significant improvement in assay performance can be achieved in this method by transporting the assay reagents back and forth through the ultra small openings on the membrane. The invention described in WO03089137A1 relies on the vacuum and/or pressure source to regulate the transport of liquids within the metal oxide substrate and requires precision pressure control equipment to achieve optimum performance.

An apparently similar invention to the present is disclosed in US20090123336A1; incorporated in its entirety by reference herein. US20090123336A1 discloses the use of an array of microchannels connected to a series of wells wherein the wells are in the format of a 384 well plate. As described in US20090123336A1, a loading well serves as a common inlet for multiple detection chambers each of which is positioned in the location of a "well" on a 384 well plate. This also represents one possible embodiment of the present invention—in a different method of use as disclosed further in this disclosure. More importantly, US20090123336A1 is limited to the use of multiple detection chambers connected to a single loading point owing to challenges in making microfluidic interconnects to the high density microfluidic channel network; which if not impossible is extremely difficult. This imposes limitations on the methods of use for the invention of US20090123336A1; which requires specialized handling steps to perform unique arrays in each of the serially connected chambers. Specifically, as disclosed in US20090123336A1, the only way to perform unique assays in the serially connected chambers is to deposit the capture antibody ON the channel surface prior to sealing the channel surface. This step in of itself would require sophisticated dispensing systems to accurately (a) deliver desired liquid volume at (b) precisely defined locations; thereby adding to the overall cost of the system. In other embodiments, a common solution is sucked into the array of serially connected channels by dipping one end of the channel path in the liquid solution. The inventors also claim that "when a common loading channel is present, reagents can be simultaneously loaded into all channels by capillary forces or a pressure difference . . . ". Although theoretically correct, it is well known in the art of microfluidics that is virtually impossible to govern flow in multiple branching channels via a single source. There will always be preferentially higher flow rate in at least one of the branching channels which implies variations in an assay performed across multiple such channels.

As will be clearer from the disclosure of the present invention as set forth herein, all of the above art differs from the present invention in or more respects as listed below:

1. All the prior disclosures use some form of pumping to displace the liquids to and from wells.
2. Most prior disclosures only use the footprint and well-position layout of the conventional microplates to incorporate multiple copies of the same microfluidic device. Furthermore, most microfluidic devices have multiple inlets and/or outlets.

3. Most prior disclosures require the same sophisticated microfluidic world-to-chip interface techniques for sample introduction or extraction.
4. Most prior disclosures would require customized instrumentation systems for fluid handling specially adapted for the given microfluidic configuration.

For point-of-care test (POCT) applications it is frequently desired to use an immunoassay based test approach that can detect across an extended dynamic range for applications such as the ones described above. The most common technique for testing at the POC is by use of the so called "Lateral Flow Assay" (LFA) technology. Examples of LFA technology are described in US20060051237A1, U.S. Pat. No. 7,491,551, WO2008122796A1, U.S. Pat. No. 5,710,005, all incorporated in their entirety by reference herein. A particularly innovative technique for LFA is also described in WO2008049083A2, incorporated in its entirety by reference herein, which employs commonly available paper as a substrate and wherein the flow paths are defined by photolithographic patterning of non-permeable (aqueous) boundaries. Advances in LFA technology are disclosed in disclosures such as US20060292700A1, incorporated in its entirety by reference herein, wherein a diffusive pad is used to improve the uniformity of the conjugation thereby providing improvements in assay performance. Other disclosures such as WO9113998A1, WO03004160A1, US20060137434A1, all incorporated in their entirety by reference herein, have used the so-called "microfluidic" technology to develop more advanced LFA devices.

Microfluidic LFA devices supposedly claim better repeatability than membrane (or porous pads) based LFA devices owing to the precision in fabrication of microchannel or microchannels+precise flow resistance patterns. In some cases, devices such as those disclosed in US20070042427A1; incorporated in its entirety by reference herein, combine commonly used technologies in both the microfluidics and LFA arts; wherein as disclosed in US20070042427A1; the flow is initiated by a bellows type pump and thereafter maintained by an absorbent pad.

Hence the present invention addresses the shortcomings of the prior art as described above and seeks to develop an easy and reliable configuration that integrates the advantages of microfluidic technology with the standardized platforms of microplate platforms. The techniques of the present invention are also unique in the sense that a "microfluidic microplate" constructed using the present invention is compatible with all the instrumentation designed for similarly sized conventional microplates.

BRIEF DESCRIPTION OF THE INVENTION

This invention contemplates and improved "microfluidic microplate" wherein a microfluidic channel is integrated with a well structure of a conventional microplate. The overall microplate dimensions and layout of wells matches those of the 96 or 384 or 1536 well formats prescribed by the SBS/ANSI standards. The microfluidic microplate consists of an array of wells defined on one face of a substrate. Each well is connected to a microfluidic channel on the opposing face of the substrate via a suitably designed through hole at the bottom of the well. The microfluidic channels are in turn sealed by an additional sealing layer which has an opening at one end (outlet) of the microchannel. Furthermore, the sealing layer is in contact with an absorbent pad.

When a liquid is introduced in the well, it is drawn into the microchannel by capillary forces. The liquid travels along the microchannel until it reaches the absorbent pad. The absorbent pad exerts stronger capillary forces than the microchannel and draws the liquid out of the channel. Preferably, it can be ensured that as the liquid exits the well and flows into the absorbent pad; the rear end of the liquid "sticks" at the interface between the well and the microchannel. At this stage, the well is completely emptied of the liquid whereas the channel is still filled with the liquid. When a second liquid is now added to the well, the capillary barrier holding the first liquid is broken and the capillary action of the pad is re-started and the second liquid is also drawn via the channel into the pad. This sequence can be repeated a number of times to complete an immunoassay sequence. Thus, the device of this invention allows for a microfluidic immunoassay sequence on a microplate platform. Furthermore, the method of using the plate is identical to a conventional microplate and the device of the present invention is also compatible with the appropriate automation equipment developed for the conventional microplates. Other embodiments of the device of the invention can be used for applications such as cell based analysis.

BRIEF DESCRIPTION OF DRAWINGS

FIG. 1 shows a top view of an embodiment of the present invention wherein an array of 96 wells is connected via through holes to 96 individual microchannels.

FIG. 3 shows a 3-dimensional illustration of an embodiment of the present invention with details of the parts that constitute the microfluidic microplate and the associated holder FIG. 4A shows an embodiment of the present invention wherein the through hole connecting the well and the microchannel conforms to certain rules.

FIG. 4B shows an alternative preferred embodiment of the present invention wherein the through hole connecting the well and microchannel contains a tapered section.

FIG. 6 shows an aspect of the present invention wherein a air-vent is incorporated in the flow path FIG. 7 shows different embodiments of the channel configuration FIG. 8 shows yet other embodiments of the channel configuration FIG. 9 shows even yet other embodiments of channel designs and effect of these on flow rate and evaporation rate FIG. 10 shows embodiments using polymer beads to increase sensitivity FIG. 11 shows an embodiment suitable for handling cells in the microfluidic microplate FIG. 13 shows an embodiment wherein a unique absorbent pad is connected to each microchannel FIG. 14A and FIG. 14B shows cross section views of the device showing the effects of compressing the absorbent pad. FIG. 14C shows an alternate embodiment to ensure reliable contact between the absorbent pad and the microfluidic channel by use of protrusion structures.

FIG. 15 shows an alternate embodiment for the absorbent pad layout wherein an absorbent pad is common to a row or column of microchannels FIG. 16 shows an alternate embodiment for the absorbent pad layout wherein an absorbent pad is common to a row or column of microchannels; and furthermore wherein the absorbent pad is on the opposite side of the substrate as the microchannels FIG. 17 shows an embodiment wherein an additional section of the microchannel is used as capillary pump and waste reservoir to replace the absorbent pad FIG. 20 shows an embodiment similar to the one in FIG. 18 except that multiple microfluidic insert plates are used.

FIG. 21A shows an embodiment of the present invention wherein multiple microfluidic reaction chambers are serially connected to a common loading well.

FIG. 22 shows an embodiment particularly well suited for low flow rates for an extended period of time.

FIG. 23 shows an embodiment for chemiluminescence based detection

FIG. 25 shows images of the microfluidic microplate FIG. 26 shows images of another embodiment of the microfluidic microplate FIG. 27 shows chemifluorescence test results comparing the microfluidic microplate to a conventional microplate.

FIG. 28 shows chemiluminescence test results comparing the microfluidic microplate to a conventional microplate.

DETAILED DESCRIPTION OF THE INVENTION

It is to be appreciated by those skilled in the art that modification or variation may be made to the preferred embodiments of the present invention, as described herein, without departing from the essential novelty of this present invention. All such modifications and variations are intended to be incorporated herein and are within the scope of this invention.

As referenced herein; μF96 or μf96 or the Optimiser™ refer to a 96 well microfluidic microplate wherein each well is connected to at least one microfluidic channel. Unless otherwise explicitly described, the microfluidic microplate shall be assumed to be made of 3 functional layers, namely the substrate layer (with the wells, through-hole structures and microchannels), the sealing tape layer, and an absorbent pad layer; wherein the "96" refers to a 96 well layout and similarly μf384 would refer to a 384 well layout and so forth. The term Optimiser™ is also used to describe the present invention and similarly, Optimiser™-96 shall refer to a 96 well layout, Optimiser™-384 shall refer to a 384 well layout and so forth. Furthermore, "microchannel" and "microfluidic channel" and "channel" all refer to the same fluidic structure unless otherwise dictated by the context. The term "interface hole" or "through hole" or "via hole" all refer to the same structure connecting the well structure to the microchannel structure unless dictated otherwise by the context. The term "cell" is used to describe a functional unit of the microfluidic microplate wherein the microfluidic microplate contains multiple essentially identically "cells" to comprise the entire microplate.

The present invention can be readily understood by examining the figures appended hereto. The basic concept can be understood by reviewing FIG. 1 and FIG. 2 and FIG. 3. FIG. 1 shows the top of view of a microfluidic 96 well plate or the microfluidic microplate. The plate matches the dimensions of conventional microplates (as defined by accepted ANSI standards). The positions of the wells also match ANSI standards. Each well is connected to a microchannel on the opposing face of the substrate. In the embodiment shown in FIG. 1, the wells and the microchannels are fabricated on the same substrate layer. A noteworthy feature of the present invention is understood from FIG. 1; wherein the loading position (for adding liquid reagents) and the detection region are in the same vertical plane; which matches the conventional microplate exactly.

Figure 2:
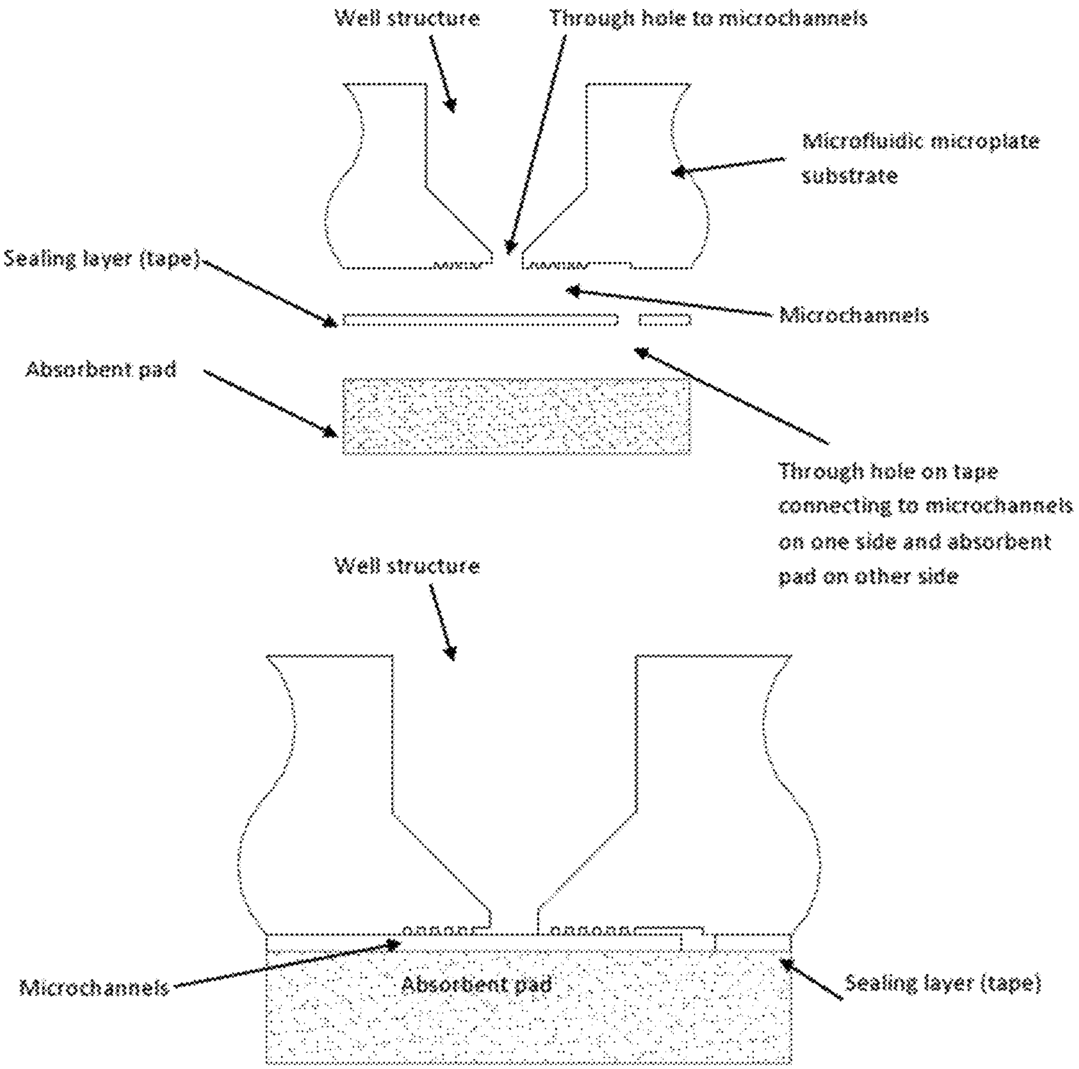
FIG. 2 shows a cross sectional view of a portion of an embodiment of the present invention illustrating the relative positions of the well structure, microchannel structure, sealing layer and absorbent pad.

FIG. 2 shows cross-sectional views of a portion of the microplate showing 1 unit of 96 in exploded and assembled views. FIG. 3A shows 3-dimensional view of the microplate, sealing layer, and absorbent pad in exploded view. FIG. 3B shows 3-dimensional view of the microplate, sealing layer, absorbent pad, and a holder in exploded view. Each well is connected to a microchannel on the opposing face of the substrate. Microchannels are sealed by a sealing layer which in turn has an opening at the other end of the microchannel (as compared to the on end connected to the through hole at the bottom of the well). Opening on sealing layer connects on the other side to an absorbent pad. In the preferred embodiments, an array of absorbent pads are used such that the absorbent pads are not in the same vertical line of sight as the loading well and the channels. Alternately, as shown in FIG. 3, the absorbent pad can be a single continuous piece connected to all the 96 microchannel outlets. When liquid is introduced in the well, it is drawn into the microchannels by capillary force; the liquid travels along the microchannel until it reaches the opening in the tape. Thereupon, liquid front contacts the absorbent pad which exerts stronger capillary force and draws liquid until well is emptied. In the preferred embodiment, the through hole, microfluidic structure and absorbent pad are designed such that as the liquid exits the well the rear end of the liquid column cannot move past the interface between the through hole and the microchannel. Consequently, the well is completely emptied of its liquid contents and the liquid is partially absorbed by the absorbent pad whereas a portion of the liquid still occupies the complete microfluidic channel. This configuration can be used as an incubation step for immunoassay based analysis.

When a second liquid is added to the well, the second liquid makes contact with the rear end of the first liquid at the interface of the through hole and the microchannel. At this stage, there is again a continuous liquid column from the absorbent pad extending via the microchannel and the through hole to the well. The lower surface tension of the liquid column filling the well will cause flow to resume and the first liquid will be completely drawn out of the channel and replaced by the second liquid. The second liquid will also be drawn out of the channel until the rear end of the second liquid now reaches the interface between the through hole and the microchannel where the flow will stop again. This sequence is continued until all steps required for an immunoassay are completed. This also illustrates a particularly advantageous aspect of the present invention—namely the fact that the sequence of operation only involves liquid addition steps. There is no need to remove the liquid from the well since it is automatically drained out. This considerably reduces the number of steps required for operation and simplifies the operation of the microfluidic microplate. Also, as described earlier, in the preferred embodiment the absorbent pads are positioned such that the pads are not in the same vertical line of sight as the reaction chambers. In this scheme the pads can be integral to the microfluidic microplate; whereas if desired, the pads can be designed to a removable component that can be discarded after the last liquid loading step, for example in the case of the embodiment shown in FIG. 3.

In preferred embodiments of the invention, the substrate containing the well, through hole and microchannel is transparent. This allows for optical monitoring of the signal from the microchannel from the top as well as bottom of the microplate; a feature that is common on a wide variety of microplate readers used in the art. In other embodiments, the substrate may be an opaque material such that the optical signal from the microchannel can only be read from the face containing the channel. For example, in the embodiment shown in FIG. 2, the signal can only be read from the "bottom" if the substrate were an opaque material. As described later, yet another method could use rotation of an insert layer to allow for top reading with an opaque substrate material.

The microfluidic microplate can be manufactured by a conventional injection molding process and all commonly used thermoplastics suitable for injection molding can be used as a substrate material for the microfluidic microplate. In some preferred embodiments, the microfluidic microplate is made from a Polystyrene material which is well known in the art as a suitable material for microplates. In other preferred embodiments, the microfluidic microplate is made from Cyclic Olefin Copolymer (COC) or Cyclic Olefin Polymer (COP) materials which are known in the art to exhibit a lower auto-fluorescence and consequently lower background noise in fluorescence or absorbance based detection applications.

An example assay sequence for a sandwich immunoassay utilizing the present invention is described below. By using well known techniques in the art; a wide variety of such assays can be performed on the microfluidic microplate according to the invention. As is readily evident from the description, all of the reagent addition steps can be performed by automation systems designed to handle liquids for current microplate formats without any changes being necessary.

Operation

1. To cause a flow sequence; the first liquid is pipetted into the well.
2. The volume of the liquid loaded into the well should be at least slightly larger than the internal volume of the channel.
3. The liquid will be drawn into the microfluidic channel and will continue to move due to capillary force.
4. The liquid will flow from the well via the channel till it reaches the outlet where it will touch the absorbent pad.
5. After this, the absorbent pad will continue to draw the liquid till all the liquid in the well is emptied into the channel and then into the pad. The liquid flow will stop when the rear end of the liquid column reaches the interface between the through hole at the base of the well and the channel.
6. The flow rate in this configuration is completely controlled by (a) liquid type; (b) geometries of well and channel and interface ports (namely the through hole) (c) material properties of the μf96 (or Optimiser™) microplate; specifically surface properties; and (d) absorbing characteristic of the pad.
   a. The flow rate can be manipulated by varying any one of the parameters.
   b. The initial "filling" flow rate is independent of the pad and is based only on channel properties
   c. Thereafter the channel acts as a fixed resistance (except at the very end when the liquid is emptying) and the pad acts as a vacuum (or capillary suction) source.
   d. If desired, the assay steps can be under static incubation to ensure that there is minimal effect of flow rate variation on assay response.
7. After this a second liquid may be added and the same sequence can be repeated.
   a. Alternately, the second liquid can be loaded just as the first liquid is emptying from the well. This will lead to a continuous liquid column without a stop in flow between the first and second liquid.
8. After the last liquid that should be added is passed through the system, the absorbent pad(s) may be removed if desired. The lack of further capillary force will guarantee a stop to the liquid motion.
9. The plate can be read from the top of the well or from the bottom side or if the well structure interferes with optical signals, the μf96 (or Optimiser™) may be flipped over and read from the channel side. If the latter is required, the plate configuration should be modified such that the plate still fits a standard holder for SBS/ANSI 96 well plates.

Resulting Assay

1. Add capture antibody and flow—capture antibody will non-specifically adsorb on channel surface. Repeated injections of capture antibody solution can potentially increase concentration on surface.
2. Wait till the capture antibody solution is completely sucked through the well. The capture antibody solution is still completely filling the microchannel. Incubate to allow capture antibody conjugation to channel surface.
3. Add blocking buffer and flow; incubate to allow blocking media to conjugate to remaining channel surface.
4. Add sample and flow; incubate to allow target analyte to link with capture antibody
   a. Optionally, repeated injections of sample can increase detection sensitivity
5. (Optional) flush again
6. Add labeled detection antibody and flow; incubate to allow detection antibody to conjugate to captured target analyte
7. Flush with buffer
8. For Fluorescence based assay, the plate can now be transferred to reader
9. For luminescence assay—add substrate which will fill channel and allow it to incubate
10. For luminescence assay, the plate can now be transferred to reader The well structure shown in FIG. 2 consists of a straight (cylindrical) section and a tapering (conical) section. The taper allows for complete flushing out of well contents as opposed to having a small through at the base of a cylindrical well structure. As can be readily imagined a wide variety of configuration configurations are possible for this basic configuration scheme; for instance when the through hole is not at the center of the well but offset to one side; or wherein the microchannel pattern is of different configuration; or wherein the absorbent pad is placed in a different position; or wherein the relative depth and/or position of the well structure and microchannel with respect to total plate thickness (set as 14.35 mm by SBS/ANSI standards) is varied. Indeed, although highly desirable for standardization, the Optimiser™ microfluidic microplate can also be made to dimensions not confirming to the ANSI/SBS specs in certain examples. A few of these are described as examples of embodiments possible with this configuration concept. The embodiments described herein are merely to illustrate the flexibility of this invention and are not intended to limit the present invention in any way.

One preferred embodiment is shown in the 3-dimensional (3D) view of FIG. 3. As shown in FIG. 3 insert, the well does not have a "straight" section at the top, but only a taper section. This minimizes the potential for any residue at the transition point from the vertical wall to the tapered wall of the well. Also, as shown in FIG. 2 and FIG. 3, the well may be configured such that the substrate completely surrounds the well or the surrounding substrate may be created in the form of "lip" structure. The latter minimizes the amount of polymer material required for the part thereby reducing cost. The use of the "lip" structure also makes the part more amenable to injection molding operations since the lower amount of material in this configuration exhibits less shrink during the molding process; which is advantageous since said shrink may cause distortion of the well, through hole and microchannel patterns.

One preferred aspect of the present invention is shown in FIG. 4A. As shown in FIG. 4A preferably, the width of the hole (w) shall be greater than, and at least equal to, the depth (d) of the hole. This ensures that when liquid is introduced in the well, the front meniscus of the liquid can "dip" and touch the surface of the sealing tape. The meniscus also touches all 4 "walls" of the microchannel connected to one part of the hole (left hand side in above referenced figure). Thereafter, capillary forces will draw the liquid from the well and fill the microchannel. In order to ensure that the liquid fills the microchannel at least one of the walls of the microchannel should be hydrophilic. In a preferred embodiment, the sealing layer is an appropriate adhesive film wherein the adhesive exhibits a hydrophilic behavior. This will ensure that when the liquid is loaded into the well and the front meniscus touches the sealing tape, the liquid will "spread" on the tape; touch the microchannel section and thereafter continue to be drawn into the channel. In further preferred embodiments, the sealing layer may another plastic that is similar to the one used to fabricate the well and channel structures and the two are assembled using techniques well know in the art such as thermal bonding, adhesive film assisted bonding, laser or ultrasonic bonding to name a few. In the alternate embodiment; the channel may be "primed" by forcing a first liquid through the channel. This can be easily accomplished by positioning a pipette tip or other suitable liquid handling tool against the interface hole such that it creates a reasonable seal. Then injection of liquid will result in at least a part of the liquid being injected in the channel and thereafter capillary forces will ensure that the liquid continues to fill the channel. Extending this further, in still another preferred embodiment, not just the initial but all assay steps can also be easily performed by injecting solutions directly in the channels and wherein the well structure is only used a guide for the pipette or other fluid loading tool. In yet another embodiment, all the walls of the channel are treated to be hydrophilic by appropriate choice of surface treatments that are well known in the art. In yet another embodiment, the substrate material including all microchannel walls can be rendered hydrophilic using techniques well known in the art; and a hydrophobic sealing tape may be used. The choice of surface treatment (i.e. final surface tension of the walls with respect to liquids) depends on the intended assay application. In most cases, it is preferred to have a hydrophobic surface to allow for hydrophobic interaction based binding of biomolecules to the surface. In other cases, a hydrophilic surface may be more suitable for hydrophilic interactions of the biomolecule with the binding surface; and in even other cases; a combination of hydrophobic and hydrophilic surface may be desired to allow both types of biomolecules to bind.

In yet another embodiment of the invention, a first "priming" liquid is used to fill the channel. Liquids such as Isopropyl Alcohol exhibit an extremely low contact angle with most polymers and exhibit very good wicking flow. Such as liquid will fill the channel regardless of whether the channel walls are hydrophilic or hydrophilic. Once the liquid contacts the absorbent pad a continuous path is created to the loading well. Liquids added thereafter will be automatically drawn into the channel. In combination with the microchannel surface, the well surface may also be modified to enhance or detract from the capillary forces exerted on the liquid column. For example, if a strongly hydrophilic treatment is rendered on the well surface, the rear meniscus will have a strongly concave shape wherein the bulge of the meniscus is directed towards the bottom of the well. This meniscus shape will compete with the meniscus shape at the front end of the liquid column (before it touches absorbent pad) and ensure a slow fill. If on the other hand the well surface is rendered strongly hydrophobic the rear meniscus may achieve a convex shape wherein the bulge of the meniscus is towards the top of the well. This meniscus shape will add to the capillary force present at the front end of the liquid column and cause a faster flow rate.

In other preferred embodiments, the sealing layer can be designed to be reversibly attached to the microchannel substrate. In this configuration, the sealing layer can be removed for a portion of the fluidic steps; for example for absorbance assays; the sealing layer can be removed gently and a stop solution is added to stop the absorbance reaction. In even other embodiments, the sealing layer may be a specific material that is suitable for other methods of assay analysis; for example the sealing layer may be chosen to be particularly well suited to capture immuno-precipitation by products from a relevant assay.

In another embodiment of the invention as shown in FIG. 4B, the through-hole structure itself can be tapered rather than a cylindrical geometry with straight sidewalls as shown in FIG. 4A. The taper shape will assist in the capillary action in drawing the liquid from the well via the through hole to at least one hydrophilic microchannel wall. In yet other embodiments; the well and through-hole structures shown in FIG. 4A or FIG. 4B may be selectively treated to impart a different surface functionality. For instance, the substrate layer may be substantially hydrophobic with only the inside surface of well and the through-hole treated to be hydrophilic. The substrate layer is turn sealed by a hydrophilic tape. Hence in this configuration; there is a continuous hydrophilic path from the well to the through hole to the base of the microchannel (tape) ensuring that the liquid consistently fills the microchannel without any intervening air bubbles.

Figure 5:
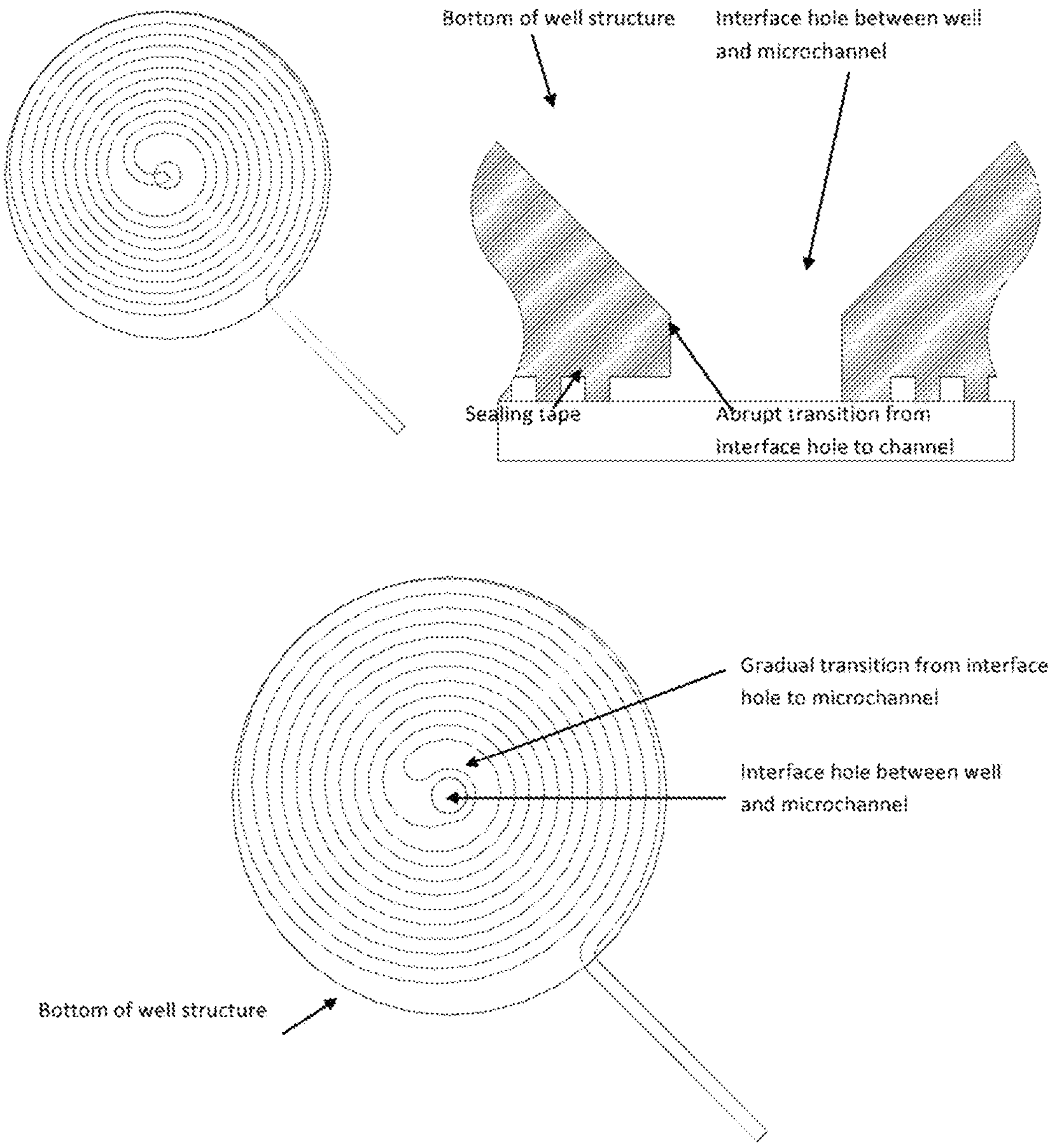
FIG. 5 shows different e microchannel sections in the device of the invention connecting to the through hole at the bottom of the well.

Other preferred embodiments of the present invention are shown in FIG. 5. FIG. 5 shows embodiments of the microchannel configuration at the interface hole between the well and the microchannel. In FIG. 5A; there is an abrupt transition from the cross sectional area of the through hole to the cross sectional area of the microchannel. Since the cross sectional area of the channel is much smaller; the liquid exiting the well will stop at the interface. In FIG. 5B the microchannel is slightly larger than the interface hole and furthermore, the channel cross section gradually tapers to the final dimension. In this case, as the liquid exits the well, it will continue to flow (into absorbent pad) until even the microchannel is completely emptied. Alternately an absorbent pad with very high capillary force can be used such that even with the configuration of FIG. 5A the microchannel is completely emptied. In the former case, wherein the liquid remains in the microchannel until the next liquid is added, the condition can be used as an incubation step. It is advantageous to use this configuration since in this case, the assay performance is relatively independent of slight variations in flow rate that may occur if a purely flow through assay is used. The latter case, wherein the liquid never stops in the channel; alternatively called a continuous-flow or through flow assay; the assay operation is significantly quicker. This may be advantageous in applications wherein in response time is more critical than control over precision as is the case for some point-of-care test applications. The flow-through mode may also be exploited advantageously to increase the sensitivity of detection. For instance, when the first binding agent (capture antibody) is already coated on the microchannel walls; and remaining unbound binding sites are blocked; a much larger volume of sample (containing target antigen or analyte) can be loaded in the well. As the liquid slowly flows past the channel wall; an increasing amount of antigen can link with the capture antibody on the surface. In effect, the flow-through mode serves to replenish the supply of target antigen/analyte exposed to the binding sites until a large fraction of the binding sites are linked with the antigen. Then a detection or secondary antibody is linked to the bound target as described earlier and this scheme can detect much lower concentrations of the target from a given sample. The rapid reaction kinetics on the microscale ensures that a significant portion of antigen can link with the capture antibody within the short duration that the liquid is within the channel in flow through mode (few seconds).

FIG. 6 shows a configuration feature that further aids in the reliable performance of the flow sequence wherein an incubation step is desired. As shown in FIG. 6, an air-vent hole is designed towards the outlet of the microchannel in close proximity to the outlet hole on the tape. With this configuration, as the liquid is emptied from the well, the rear end of the liquid will get “stuck” at the interface between the through-hole and the microchannel. A high capillary force absorption pad may continue to exert a capillary force that would normally cause the liquid to empty from the microchannel as well. In effect, the absorbent pad is acting as a vacuum source and creating a negative pressure at the front end of the liquid column. As the liquid is sucked out by the absorbent pad, the liquid column will “retract” back into the microchannel. When the front end of the liquid channel retract beyond the air-vent hole, the capillary action of the pad will come to a halt, since the negative pressure (from the pad) is relieved by atmospheric pressure via the air-vent hole. The air vent hole can also be positioned inside the perimeter of the outlet hole on the sealing tape. The latter configuration will ensure that as soon as the liquid retracts slightly (due to continued absorption by pad), the air-vent will allow the negative pressure to dissipate. As described further, it is necessary to ensure that the liquid retracts backwards, i.e. away from the outlet. If the liquid front were to remain stationary (at outlet) and instead if the rear end of the liquid column (at the through-hole interface) were to move into the channel; i.e. away from inlet; an air-bubble would be formed when an additional liquid is loaded in the well. The intervening air-bubble between the two different liquids would cause the capillary action to stop and prevent further operation.

An important aspect of the current invention is the use of microfluidic channels to perform the immunoassay as opposed to the well structure in a conventional microplate. It is well known in the art that the high surface area to volume ratio of the microchannels allows for (a) rapid reactions due to limited diffusion distances and (b) low reaction volumes. A wide variety of microchannel configurations can be used in the practice of this invention. As shown in the TABLE below, the surface area to volume ratio increases as the channel size decreases with attendant decrease in liquid volume required to completely fill the channels. The channel dimension will be determined based on requirement for flow rate, surface area, and surface area to volume (SAV) ratio. For example; assuming a 500 um loading well in the center, and wherein the radius of the largest spiral channel is approximately 3 mm; the following configurations are possible. All such variations are considered within the scope of this invention.

Effect of channel dimensions (approximate)
Assuming width (w) = depth (d) = spacing (s) of spiral channel
Increase in Area is with reference to bottom area of a 96 well plate

| w, d, s | Length | Area | Inc in A | Vol. (µl) | SA/V ratio |
|---|---|---|---|---|---|
| 0.05 | 152 | 30.44 | 8% | 0.38 | 80.10526 |
| 0.1 | 109 | 43.73 | 55% | 1.09 | 40.11927 |
| 0.2 | 84 | 66.85 | 136% | 3.34 | 20.01497 |
| 0.5 | 75.4 | 150.8 | 433% | 18.85 | 8 |

Of course, a wide variety of channel configurations are also possible in addition to the spiral configuration shown in earlier figures. FIG. 7A shows a serpentine channel which is equally well suited to the present invention. Furthermore, the channel may include a continuous taper from the inlet to the outlet. The taper will ensure that there is increasing capillary force on the front end of the liquid column and result in a different flow rate than in the case when the channel is not tapered. In other embodiments, the taper may be designed from the outlet to the inlet such that the channel gradually widens from inlet to outlet. This will result in yet another flow rate compared to the first taper or when there is no taper. The difference in flow rate may have a significant impact on continuous-flow through flow assays or the liquid filling behavior for static incubation assays and can be advantageously used to afford further configuration flexibility. In yet other embodiments, the channels may be designed to be non-symmetric i.e. width not equal to depth not equal to spacing or combinations thereof.

Other preferred embodiments for the microchannel are illustrated in FIG. 8. As shown in FIG. 8A; the microchannel has a composite geometry wherein the microchannel cross-sectional dimensions at the highlighted end section are different compared to the cross-sectional dimensions of the rest of the microchannel. The end microchannel section has at least one dimension larger than the comparable dimension for the rest of the microchannel. For example, the end section may be 300 μm wide×200 μm deep whereas the rest of the microchannel may be 200 μm wide×200 μm deep. This ensures that the end section has a lower flow resistance than the preceding channel. This configuration is useful in ensuring optimum flow performance for the static incubation case. As described earlier in conjunction with the explanation for FIG. 6, it is preferred that continued action of the absorbent pad draw liquid out such that the liquid retracts backwards from the outlet. The configuration shown in FIG. 8 can ensure that the since the flow resistance for the front end of the liquid column (closer to outlet) is lower than the flow resistance for the rear-end of the liquid column (at through-hole interface), the liquid will always "retract" backward from the outlet.

Another preferred embodiment that can achieve is a similar effect is shown in FIG. 8B; wherein the highlighted initial section is different compared to the cross-sectional dimensions of the rest of the microchannel. The initial microchannel section has at least one dimension smaller than the comparable dimension for the rest of the microchannel. For example, the initial section may be 100 μm wide×200 μm deep whereas the rest of the microchannel may be 200 μm wide×200 μm deep. This ensures that the initial section has a higher flow resistance than the remainder. This will also ensure that the liquid always retract backward; i.e. away from the outlet rather than retracting into the channel; i.e. away from the inlet. Furthermore, the use of a high resistance section at the start of the microchannel is also advantageous for flow regulation for continuous-flow or flow-through mode. As shown in FIG. 9 and associated TABLE, the flow rate within the microchannel is highly dependent on the microchannel dimension. The flow-through mode requires (1) a precise control over the flow rate to ensure repeatable performance and (2) ability to flow at low flow rates to allow for sufficient residence time for liquid flow through the channel to ensure maximum adsorption/linking of biochemicals in liquid to the ligands on the channel walls. As illustrated in the different dimensions shown in FIG. 9 and associated TABLE, a combination of these embodiments may also be used for added configuration flexibility.

Figure 12:
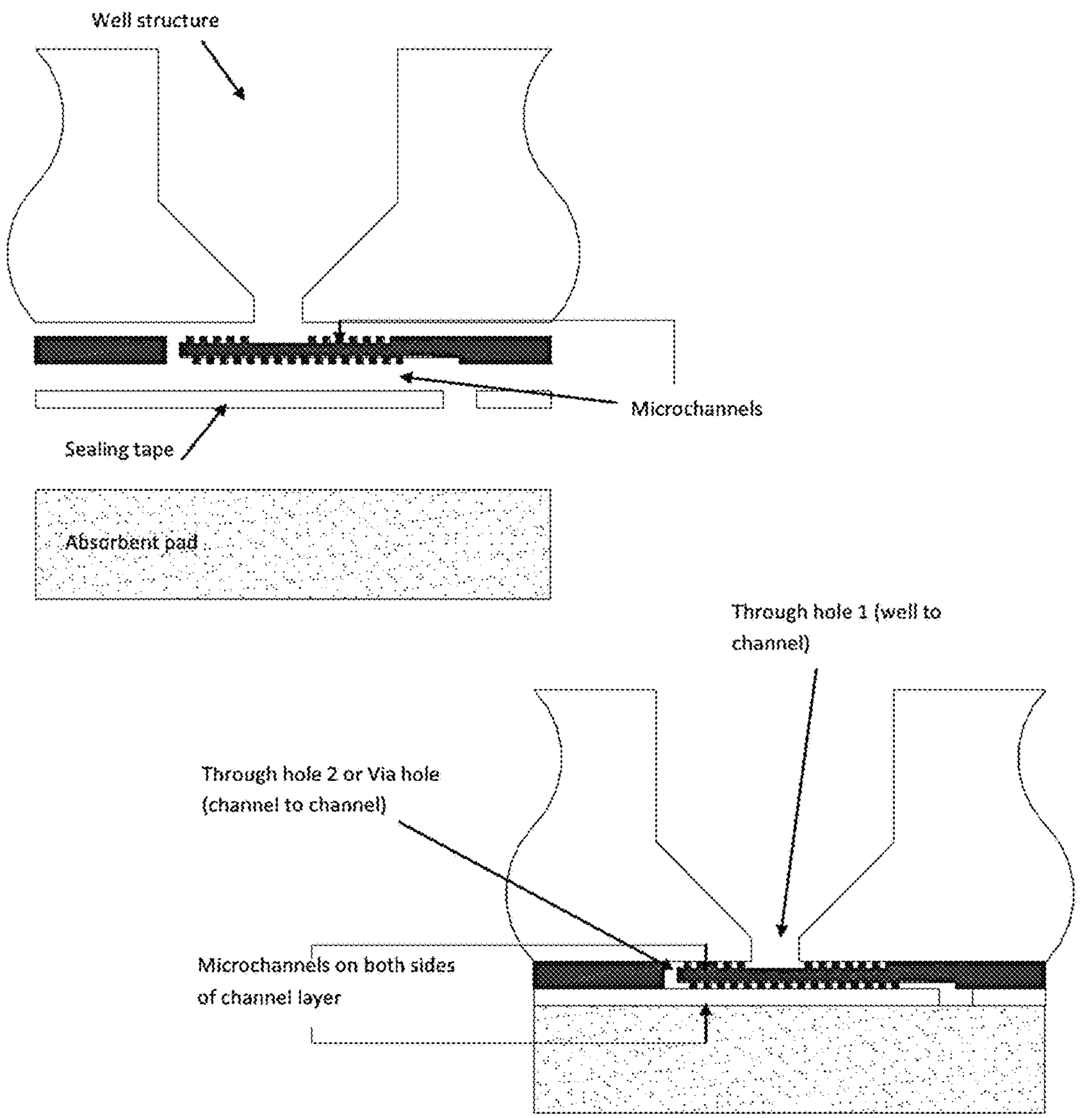
FIG. 12 shows even yet other configuration embodiments of the channel configuration

An alternate configuration is shown in FIG. 12, wherein the well structure and the microchannel structure are defined on two different substrates. In this configuration, the microchannel is defined on two faces of the substrate such that channel on one face correspond to wall regions of the second face and vice versa. This ensures that there is no wasted space in the horizontal footprint of the well bottom and a greater assay signal can be generated.

As explained earlier; the advantage of microchannels over conventional scale analysis chambers is the high surface area to volume ratio within channels. This can be further magnified by the use of a variety of techniques well known in the art. One such approach is shown in FIG. 10A; wherein the channel is packed with an array of beads. A wide variety of beads can be used for this application including magnetic, non-magnetic; polymer, silica; glass beads to name a few. Alternately, the channel can have monolithic polymer columns created using self-assembly or other appropriate assembly methods. All of these, and other well known techniques in the art, can significantly increase the net surface area inside the microchannel and can allow for even faster reaction times than microchannel devices. The use of beads allows for greater flexibility in device operation as further explained later in this description. When beads (polymer or otherwise) are to be used—they are directly dispensed onto suitable sized hole at bottom of well. The channel dimension is selected such that beads can flow freely through them. Then the beads will flow all the way to the outlet till they reach the absorbent pad which will prevent further motion of beads. At this stage, the absorbent pad may be replaced if desired to remove any residue of solution in which beads are suspended. Further steps will remain the same. Alternately, the beads may be packed by using self assembly techniques or slurry packing methods.

In a particularly preferred embodiment, the beads are the Ultralink Biosupport™ agarose gel beads. These beads offer a porous surface area that greatly magnifies the surface area of the beads. Furthermore, the beads are well suited for covalent linking of biochemicals such as capture antibodies. After a high surface concentration of the capture antibody is linked to the beads, the remainder of the bead surface can be effectively passivated to minimize non-specific adsorption. The Ultralink Biosupport™ beads are commonly used in affinity liquid column chromatography such as Fast Protein Liquid Chromatography (FPLC) and their use in microfluidic channels allows for a tremendous increase in sensitivity. For FPLC applications, the beads are "prepared" by covalent linkage of capture entity and subsequent passivation in liquid containers such as test tubes, and then packing beads in the FPLC column. For the microfluidic microplate, a similar approach can be used, and alternately these processes can also be performed by first entrapping the beads in a suitably designed geometry and then adding the linking chemistry and passivation solutions in series. This offers greater flexibility in providing "generic" microplates pre-packed with beads and allowing the end-user to link the desired chemistries to the beads.

The embodiment shown in FIG. 10A is particularly well suited for applications where extremely high sensitivity is desired. An alternate embodiment using microbeads is shown in FIG. 10B. As shown in FIG. 10B, the beads are only trapped in the through hole connecting the well to the channel. In fact the channel dimensions are designed such that the channel acts as trapping geometry and the narrow dimensions do not allow any beads to enter the channel. It is important to note that in this embodiment, the small bead packed column is the "reaction chamber", and the microfluidic channel only serves to transport the liquid away from the base of this bead column to the outlet and is consequently only a straight section. The extremely high binding capacity of the Ultralink Biosupport™ beads allows for adequate sensitivity in immunoassay applications even when a very small "bead column" as illustrated in FIG. 10B is used. This embodiment is particularly well suited for high density microplates such as the 384-well and 1536-well configurations.

As described above, one technique to use the beads (Ultraink Biosupport™ or others) is to coat the beads with the desired agent and then load them into the channel (or through hole). This approach limits the microplate to the antigen that will react with the coated capture molecule. At the same time, the "pre-coating" also renders the bead surface hydrophilic allowing for capillary flow to occur within the bead packed column. For the "generic" microplate wherein uncoated beads are used, the hydrophobic surface of the uncoated/non-passivated beads will greatly reduce if not completely inhibit capillary flow. In order to circumvent this problem, a mixture of treated and untreated beads can be used. For example, when the beads are prepared for loading (in the manufacturing facility) an appropriate ratio of untreated (hydrophobic) and passivated (surface rendered hydrophilic) can be mixed and loaded in the channel or through hole. This will ensure that the packed bead column can support capillary flow action at the expense of reduced binding sites (on passivated beads). Despite the reduction, the net number of binding sites will still be considerably higher than the binding sites only on the walls of the microchannel.

The present invention is not limited to assay analysis only. For example, the configuration shown in FIG. 11 may be used for cell based analysis. The pillar array within the channel can entrap cells as they are transported from the well and trapped at precisely defined locations. Thereafter, the cells may be exposed to different chemical to study the effects of such chemicals on certain cellular functions. In certain cases, the response may be in form of chemical released from the cell. In this case, the assay sequence can be designed such that after the cell solution is added and before the stimulating chemical is added, the absorbent pad(s) is replaced with a new pad. Hence the chemicals released from the cells can be collected into the absorbent pads and further analyzed. In other embodiments, the surface of the microchannels may be suitably treated to ensure that cells can adhere to the walls. In this example, the cells can first be cultivated and grown in the microchannels and subsequently exposed to test chemicals.

In all embodiments of this invention, the absorbent pad may be common for all fluid handling steps or may be designed such that it is replaced after each fluid handling step or after a selected set of steps. Furthermore, the absorbent pad may be removed after the final fluid processing step or may remain embedded in the microfluidic microplate. In the preferred embodiments, the absorbent pads are configured such that they do not overlap the microchannel and/or well structures. This ensures that there is an optically clear path for detection of assay signal without removing the absorbent pads. FIG. 13 shows one such embodiment, wherein a unique absorbent pad is used with each well+channel structure. Also as shown in FIG. 13; the absorbent pad may be located on the microplate or may be located on a separate layer. In the latter case, the microfluidic microplate is positioned over the substrate holding the absorbent pads using an appropriate jig configuration. Naturally, in all cases the absorbent pad may also be a continuous sheet common to all the "wells" of the microfluidic microplate.

A potential problem with using continuous absorbent pads in a completely transparent configuration is the fact that the pad will soak up all assay reagents (including the optically active components). It is then impossible to distinguish the optical signal from the microchannel from the optical signal from the absorbed components in the pad. In most embodiments, the sealing tape is envisioned as a hydrophilic adhesive on a transparent liner. In cases wherein the absorbent pad is a continuous sheet, the sealing tape can be selected such that the hydrophilic adhesive is deposited on an opaque liner. The tape is punch-cut to create an outlet hole similar to the one previously described. The end of the microchannel and the outlet hole is positioned away from the vertical viewing window of the well and the spiral microchannel pattern. This configuration with the opaque tape liner will allow for a continuous sheet of the absorbent pad to be used without the optical cross-talk effect since the only "window" to the pad will be the punch-cut hole on the sealing film which in turn is positioned away from the viewing window. The microfluidic microplate is limited to a "top-read" mode; but the pad can be integrated as part of the microplate thereby eliminating the need for a holder. The configuration will partly be dictated by application; for example: for manual use, a removable pad is easy for an operator to remove prior to reading whereas for High Throughput Screening using automated equipment it is preferred to have the pad integrated for compatibility with current instruments.

As shown in FIG. 5, the abrupt transition from the through hole at the bottom of the well and the microchannel leads to an abrupt change in surface tension pressure of the liquid column and stops flow at that interface. A similar situation may also occur at the outlet end as shown in FIG. 14A. The use of an additional base layer to compress the absorbent pad can ensure that the relatively flexible absorbent pad will bulge into the cavity created on the sealing film; as shown in FIG. 14B. The bulge will furthermore directly touch the microchannel cross-section where the microchannel interfaces with the outlet hole. This can ensure that the absorbent pad is always in "contact" with the exiting liquid. Alternately as shown in FIG. 14C a protrusion structure may be fabricated at the end of the microchannel in the outlet section. The protrusion structure may be designed such that the flat surface of the protrusion structure (away from substrate) approximately aligns with the surface of the sealing tape (away from substrate); thereby minimizing the transition effect. FIG. 14C shows a range of geometries that can be used to create the protrusion structure.

FIG. 15 shows another embodiment wherein the pads are designed as strips furthermore where one strip of absorbent pad is common to a row (or column) of well+channel structures. FIG. 16 shows even yet another embodiment wherein the absorbent pad strips are positioned from the "top"; i.e. on the opposing face from the microchannels. Thus, a wide variety of designs can be used to position the absorbent pads without departing from the spirit of the invention.

As is also readily evident, ANY material that is capable of exerting a capillary force higher than that exerted by the microchannels is suitable for use as absorbent pad. A wide variety of materials such as filter papers, cleanroom tissues etc. are readily obvious examples. Other esoteric absorbent "pads" may include a dense arrangement for example of micron sized silica beads in a well structure. These would exert extremely high capillary force and all are envisioned as absorbent pads within the present invention.

In fact, a configuration wherein the microchannel itself is used as capillary pump and waste reservoir is illustrated in FIG. 17. As shown in FIG. 17, the architecture is modified such that fewer wells are "functional" on the 96-well layout. Each well is connected via through-hole to a microchannel. The microchannel in this embodiment is divided in two zones; the "functional" channel and the "waste" channel. The waste channel is designed such that it can accommodate all the liquid that is added during a multi-step assay sequence. As the first liquid is added it will flow through the initial "functional" sectional of the channel wherein the assay reactions as described previously would occur on channel walls. Thereafter the first liquid will reach the "waste" section of the continuous microchannel. The hydrophilic tape will continue to exert a capillary force and draw the liquid out of the well. Using a larger cross-sectional area in the "waste" section of the channel, ensures that the capillary force at the "waste" channel is weaker than the capillary force at the through-hole: microchannel interface thereby stopping flow when the first liquid is drained out of the well. As the second liquid is added to the well, the capillary barrier at the base of the through hole is eliminated and flow will resume till the second liquid is drawn out of the well. This configuration allows for a fully-integrated device configuration without the need for an absorbent pad.

Furthermore, in this embodiment the air-vent is also not required since the flow is automatically regulated by the difference in dimensions between the "functional" and the "waste" channel sections. This embodiment may allow for greater reliability by minimizing the number of components used. In yet other embodiments, the waste channel may only be a through hole (directed "upwards") extending through the substrate layer forming the microplate. A reasonably thick substrate layer; which may further by non-uniform in thickness; will allow for sufficient liquid to be contained in a "waste well". The embodiment can allow for use of the microfluidic capillary pump concept without sacrificing well count.

Figure 18A:
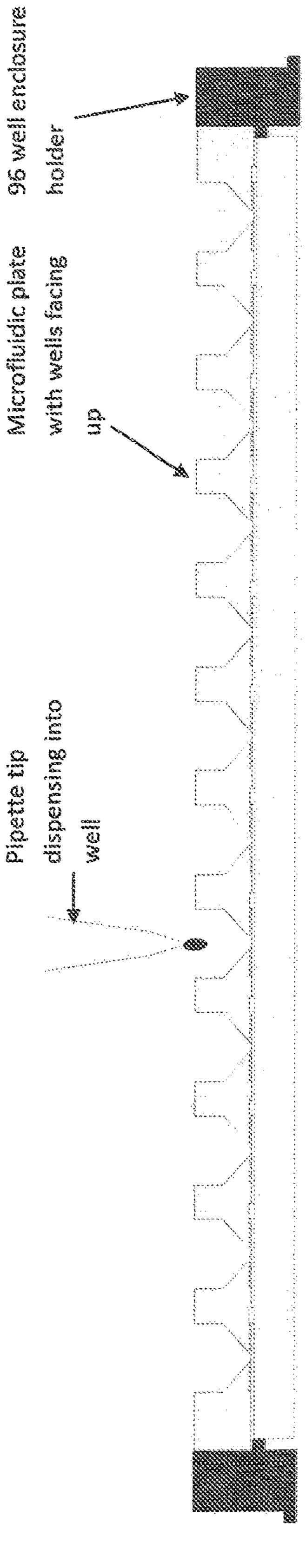
FIG. 18 shows an alternate embodiment of the device wherein a microfluidic insert plate is used instead of a single continuous substrate
Figure 18B:
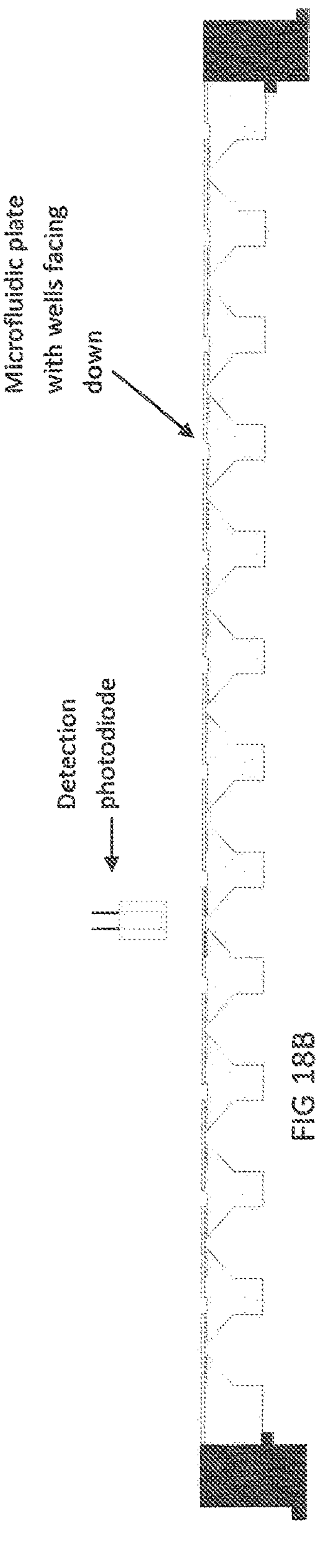
Figure 19:
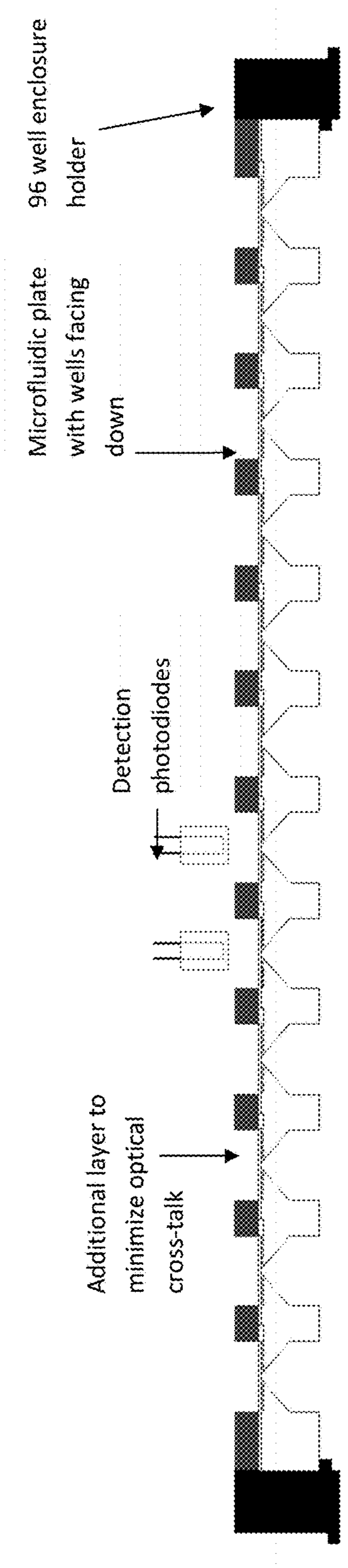
FIG. 19 shows an alternate embodiment of the device wherein a microfluidic insert plate is used instead of a single continuous substrate and an additional layer is used to minimize optical cross-talk during detection

Hitherto, the microfluidic channels and the wells are described as being a part of the same structure that also defines the external shape to match the footprint of a 96 well plate (with the exception of the embodiment shown in FIG. 12 wherein only the wells are part of the "microplate" substrate). It may be more advantageous to use the embodiment shown in FIG. 18. As shown in FIG. 18 a microfluidic insert plate is used with a surrounding enclosure—wherein the enclosure defines the shape and footprint (along perimeter) of a conventional microplate and wherein the microplate insert structure contains the well structures and the microchannel structures. The two parts may be designed such that the microfluidic insert plate can be removed from the enclosure. The use of this is illustrated in FIG. 18; wherein in one orientation; specifically where the wells are facing the top; the device is used for the assay fluidic sequence and in another orientation; specifically when the microchannel part of the microfluidic insert plate is facing up; the device is used for assay detection sequence. The enclosure may be designed such that the microfluidic insert plate can be positioned at a height that is optimum to ensure best signal from the microchannel by ensuring that the microchannels are located in the same focal plane as that of the photodetectors. This embodiment is especially well suited for fluorescence detection wherein a directional beam of light is used to cause fluorescence. For chemiluminescence applications an embodiment shown in FIG. 19 may be more suitable. In this embodiment, an additional plate is positioned on top of the inverted microfluidic insert plate. The additional plate contains openings in the regions of the microfluidic insert plate wherein the microchannels are positioned whereas the walls of the structures forming these openings are opaque. This can ensure that there is considerable reduction in the "optical cross-talk" effect where signal from one reaction chamber reaches multiple photodetectors. The embodiment of FIG. 18 is also suitable for use with an opaque substrate such that after rotation, the channel side can be read by a "top" reading microplate reader. In another alternate embodiment, the device of FIG. 12 may be fabricated such that the "well' part of the device is made from an opaque material whereas the "channel" part is made on a transparent substrate. A further alternate embodiment is also shown in FIG. 20 wherein multiple microfluidic insert plates are used. The array of inserts may be designed for a particular size such as a standard glass slide footprint of ~25 mm×~75 mm to allow; for example liquid handling equipment designed for microplates to manipulate 4 inserts simultaneously, and a slide reader to read each of the microfluidic inserts separately; in a mix-and-match manner.

FIG. 21A shows an embodiment wherein a single loading well is connected to 1 microchannel structure directly opposite it on the other face of the substrate and to multiple other chambers which are positioned on the opposing face but in locations where other wells of the microplate would normally be present. For example, as shown in FIG. 21A, an array of 24 wells in Rows 4 and 5 are connected to 4 reaction chambers each. In one application, this device may be used for conventional assays wherein identical signals from each of the 4 reaction chambers is used for verification of assay results, as is commonly done by triplicate or more readings per sample in conventional microplate based assays. In another embodiment, the use of beads can allow for greater flexibility in the device. For example, the first liquid loaded into the common loading well could contain a bead suspension solution 1; wherein the beads are conjugated to a particular capture antibody. The volume of solution 1 is designed such that when the beads pack the most downstream reaction chamber (packing due to absorbent pad as described earlier) the beads only fill that particular microchannel structure. Then a second bead solution 2 can be added which contain beads conjugated to another antibody. These would then pack in the second from last most downstream reaction chamber and so forth. Hence, each reaction chamber can be configured to detect a different analyte from a common sample source during assay operation. Alternately, an array of different capture antibodies can be screened for sensitivity towards a common analyte or other such tests can be performed using this configuration. Of course, the configuration may also be modified such that each reaction chamber connected in series to the loading well may have a different physical structure to ensure difference in assay characteristics.

Figure 21B:
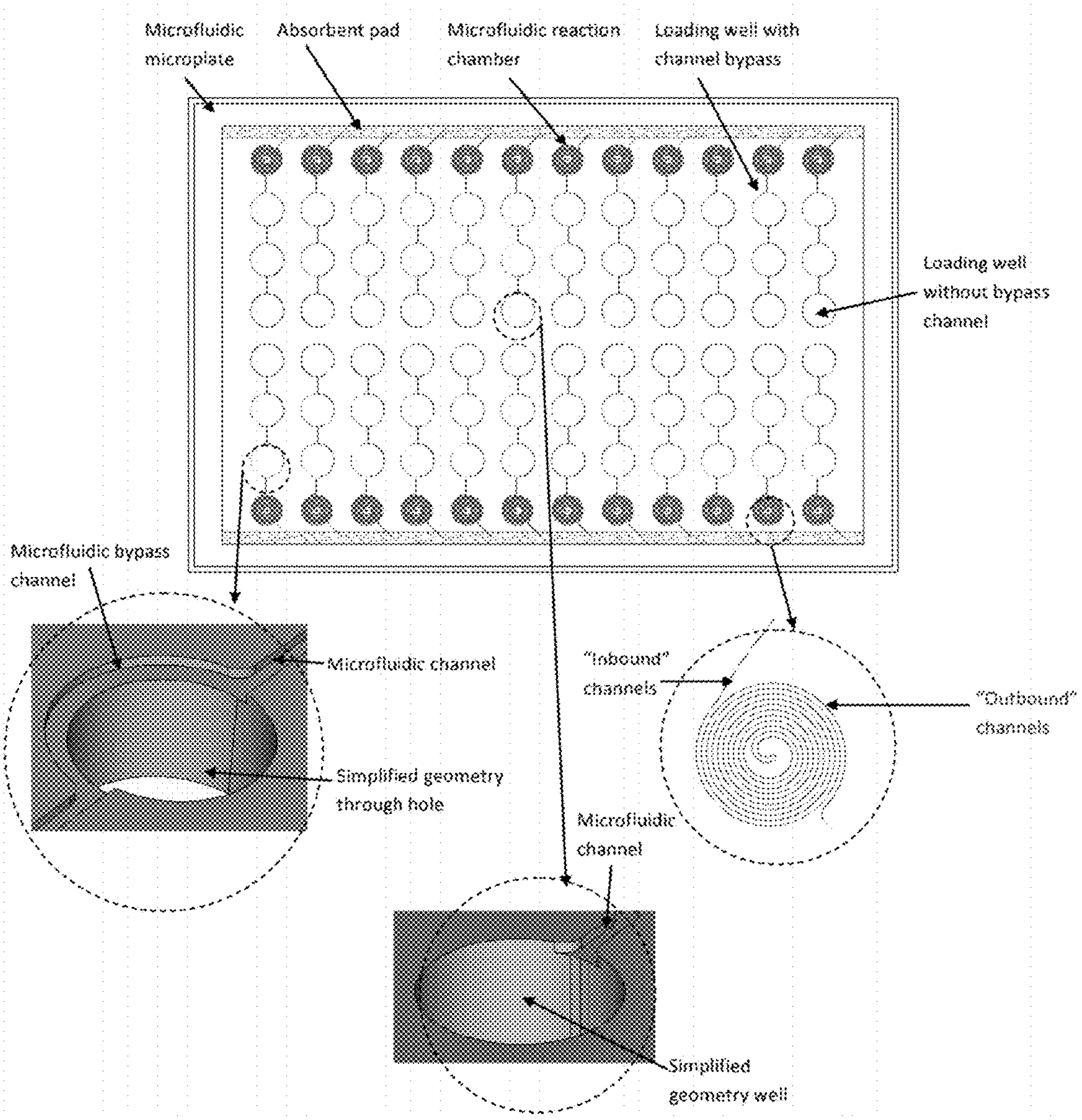
FIG. 21B shows an embodiment wherein the loading well and the microfluidic reaction chamber are not in the same vertical line of sight.

FIG. 21B shows another embodiment of the invention wherein the loading well and the microfluidic channel are de-coupled along the vertical plane. As shown in FIG. 21B a much simplified (and higher capacity) well structure; in the form of a cylindrical structure; can be used which connects to a microfluidic channel on one side. The microfluidic channel in turn leads to the spiral (or other suitably shaped) detection region which is located in the footprint of another "well" in the standard 96-well layout. Hence, in this configuration a "96-well" configuration is reduced to a 48-well configuration but with a much simplified physical structure. Additionally, this configuration allows for a very small thickness of plastic material on top of the spiral microfluidic channel serving as the reaction chamber. In designs wherein the loading well (tapered) with through hole is in the same vertical line of sight as the microchannel; there is a substantial and non-uniform thickness of plastic material above the microchannel. Specifically in fluorescence based detection applications; this increases the auto-fluorescence from the plastic material itself; since the auto-fluorescence is partially related to the thickness of the plastic material also. In the configuration of FIG. 21B, a very small (~250-500 μm) thickness of plastic material is allowed on the top of the microfluidic reaction chamber thereby greatly minimizing the background signal due to auto-fluorescence from plastic material itself.

Figure 21C:
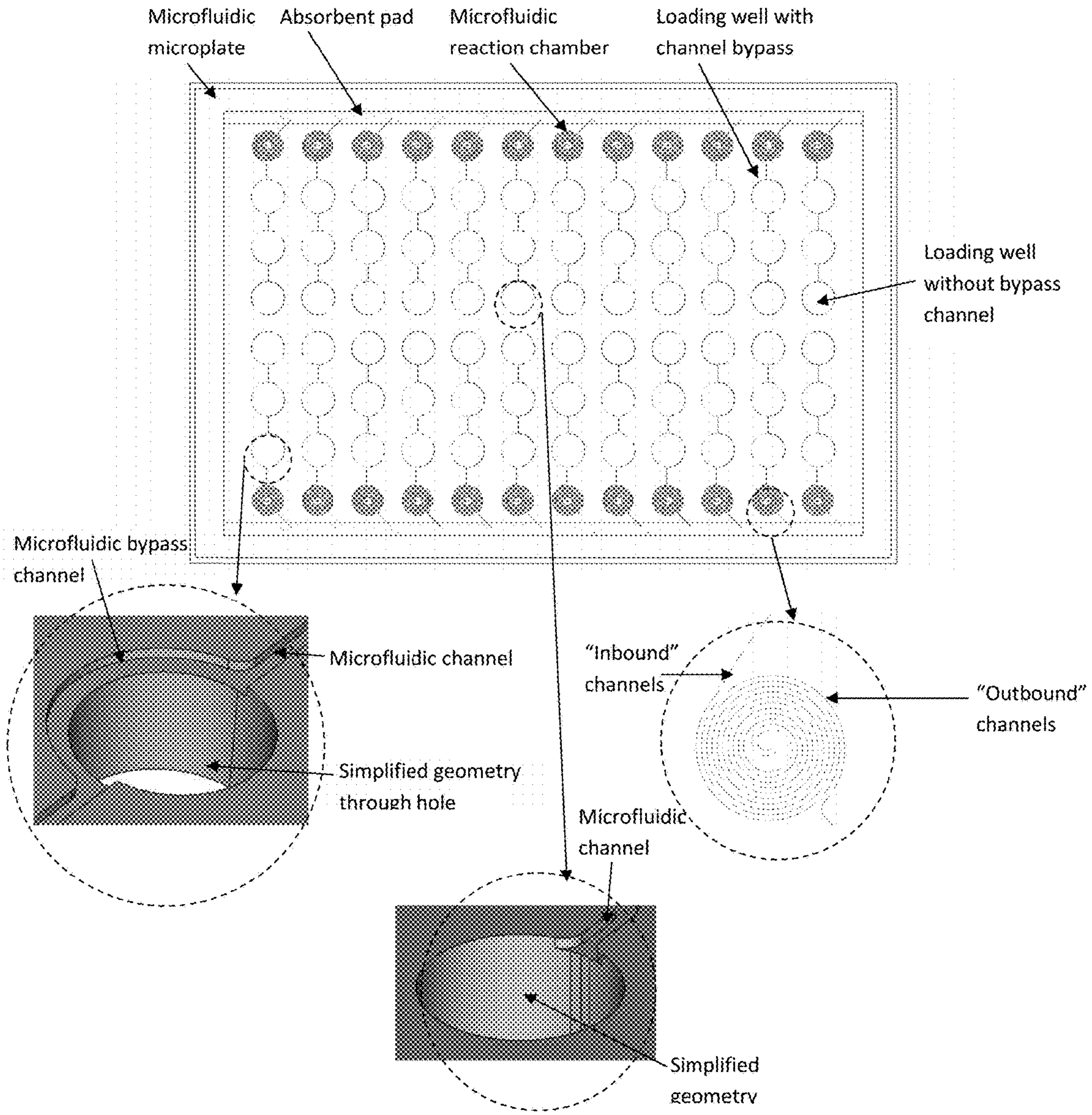
FIGS. 21C and 21D show embodiments wherein multiple loading wells are connected to a single microfluidic reaction chamber for a "semi-auto" microfluidic microplate.
Figure 21D:
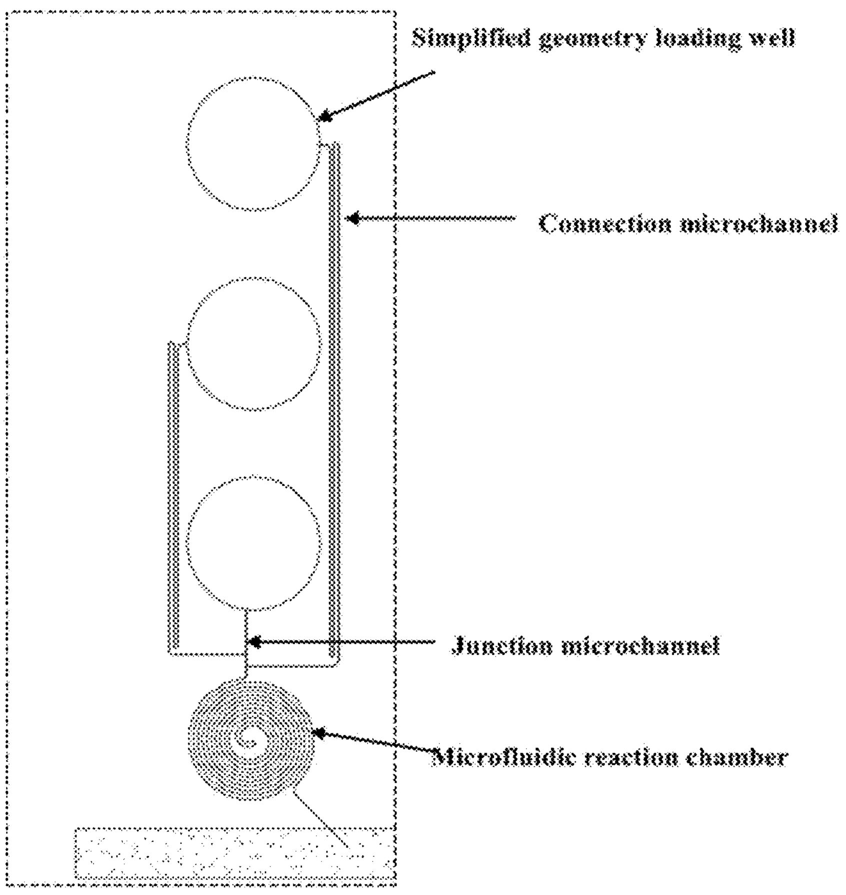

FIG. 21C and FIG. 21D show embodiments that are particularly well suited for semi-automatic operation of the microfluidic microplate.

FIG. 21C shows an embodiment of the invention wherein an array of simplified loading wells are connected to one reaction chamber. The schematic illustration shows the case wherein 3 loading wells are connected to one reaction chamber; and is readily apparent that this configuration can be scaled to higher number of loading wells leading to a single reaction chamber. The simplified loading wells after the first simplified loading well also use a specialized geometry for the connecting microfluidic channel as illustrated in the insert for FIG. 21C. The connection channel leading from the first simplified loading well connects with a smooth taper to the loading well. The connection channel for the other two wells loops around the base of the loading well such that a portion of the microchannel is in connection with the loading well. This geometry allows the loading well to serve a dual purpose; namely as loading well and also as an air-vent. During operation; all 3 loading wells are simultaneously filled with liquid reagents using a multi-channel pipette. Assuming a hydrophobic substrate and hydrophilic sealing tape; acknowledging that all variations outlined previously will also work equally effectively; as the 3 liquids are loaded in the wells; they will touch the base (sealing tape) and the hydrophilic forces will start drawing the liquids into the channels. In this description, the wells are described as Well 1 being the closest to the reaction chamber; Well 2 being the second upstream well and so forth. Liquid within Well 1 has an unobstructed flow path towards the reaction chamber and downstream to the absorbent pad and liquid from the Well 1 will immediately flow towards the chamber. Backflow of the liquid towards Well 2 is obstructed since there is no place for the intervening air (in the channel) to escape. Similarly liquid from Well 2 cannot flow in either direction owing to lack of an air escape path. Hence liquids in all wells other than Well 1 are "trapped" in position. As the liquid completely exits Well 1; liquid from Well 2 can start moving. The air in front of the liquid from Well 2 can escape from the now empty Well 1. Since the channel is a continuous section, and at all points is connected to the hydrophilic surface (tape); the flow will continue when liquid from Well 2 crosses the perimeter of Well 1 until the liquid from Well 2 passes through the reaction chamber and is emptied. Note that in all these cases, a narrower dimension is used for the reaction chamber to ensure that the Well is completely emptied of its contents. This sequence of flow events will continue and successive Wells (Well 3, Well 4 . . . ) reagents will be sequentially transported through the reaction chamber. By ensuring sufficient volumes (to complete the surface binding reactions) the entire assay sequence can be completed using just one load step. This embodiment offers two distinct benefits: (a) a significant reduction in labor required to run the assay sequence and (b) very reproducible results since the entire flow sequence is "automatically" regulated. Note that additional liquids can be accommodated in two ways: (a) by connecting additional wells in series (for example having 6 loading wells for a series of 5 reagents and sample that should be injected into the reaction chamber or (b) by repeating the loading sequence (for example, reagents 1, 2, and sample are injected first; then after all 3 have been transported through the reaction chamber; reagents 3, 4, and 5 are then loaded simultaneously).

FIG. 21D shows a different variant for an embodiment of a "semi-auto" microfluidic microplate in accordance with the invention. In this embodiment; each well drains into a channel that is connected to a common junction channel. The key difference from the configuration in FIG. 21C is that the length (hence volume) of each microchannel leading up to the junction channel is significantly different. Again, using the same naming convention as the preceding example, Well 1 has a very short path length to the reaction chamber; whereas Well 2 has a path length at least 10× longer and so on. In this configuration, as all liquids are pipetted simultaneously into their respective wells; flow will commence in all channels simultaneously. Initially, Liquid 1 (from Well 1) will reach the reaction chamber and shall be the only liquid in the reaction chamber. Thereafter, Liquid 2 (from Well 2) will reach the junction channel and a mixture of Liquid 1 and Liquid 2 will flow into the reaction chamber. The volumes of the respective Wells can be designed such that after a small volume of the mixture has passed through the reaction chamber; Well 1 is completely emptied. Thereafter, Liquid 2 alone will continue to flow through the reaction chamber until Liquid 3 (from Well 3) reaches the junction channel and so forth. This embodiment is particularly useful when two reagents should be mixed prior to loading in the reaction chamber. Examples include but are not limited to, two component chemiluminescence substrates; mixtures of labeled and sample antigens for competitive immunoassays etc. Furthermore, the flow sequence can also be designed that for a desired interval a mixture of 3 (or more) reagents is flowing simultaneously through the reaction chamber.

FIG. 22 shows yet another embodiment. In this embodiment of the invention, particularly well suited for applications wherein a slow flow rate is desired for a long interval, the microplate is mounted in a special fixture. The fixture is connected to an air pump that can pump air at room temperature or elevated temperatures through the fixture which passes on the underside of the absorbent pad. The flow sequence is designed such that prior to the step where a low, steady flow rate for an extended duration is desired, a high volume of liquid is added to completely saturate the pad such that it cannot absorb any further liquid. Then the desired liquid is added to the wells and the wells are sealed on top to prevent evaporative loss, with a small air vent structure on each well seal. Furthermore, air flow is initiated in the fixture which will cause evaporative loss of liquid from the pad. As the pad loses liquid volume, additional liquid volume will be drawn from the wells at a low flow rate for an extended period of time. The absorbent pad may be a common pad for all wells or separate pads for each well. This embodiment is particularly suited for applications such as study of cell growths wherein a steady low flow of culture media is required to maintain cell viability.

The "one-body" embodiments of the invention discussed hitherto, if manufactured on a transparent substrate are not suitable for chemiluminescence based detection due to the optical cross-talk between the optically transparent wells. For fluorescence based detection, an optical signal is only generated when the microchannel with fluorescent entity is excited and after the excitation source is removed the optical signal drops to zero almost instantaneously. In the case of chemiluminescence, each microchannel unit will continuously produce a signal when the substrate is added to the channel. Hence, when a detector "reads" the channel below a given well, it will also pick up stray light signal from adjacent channels, and this "cross-talk" may lead to unacceptable errors in measurement. If an opaque substrate is used as described in some embodiments, the embodiment is suitable for chemiluminescence based detection but requires either bottom-reading mode or rotating the plate to have the channel side facing up. Most luminometers are only designed for top mode reading and the rotation step is not suitable for automation.

FIG. 23 shows an embodiment of the microfluidic microplate of the invention that is particularly well suited for chemiluminescence based detection applications. The embodiment of FIG. 23 uses a two-piece configuration, wherein a opaque piece is used to completely surround each well+through hole+channel "cell" of the microfluidic microplate; where each cell is composed of a transparent material. This configuration ensures that each cell is almost completely isolated from others where the only optical path is through the sealing tape if a continuous tape is used. If in other embodiments, each cell is also sealed individually the cells would be completely isolated from other cells. The embodiment of FIG. 23 considerably minimizes the optical cross-talk between the microfluidic microplate cells allowing for reliable chemiluminescence based detection.

Figure 24:
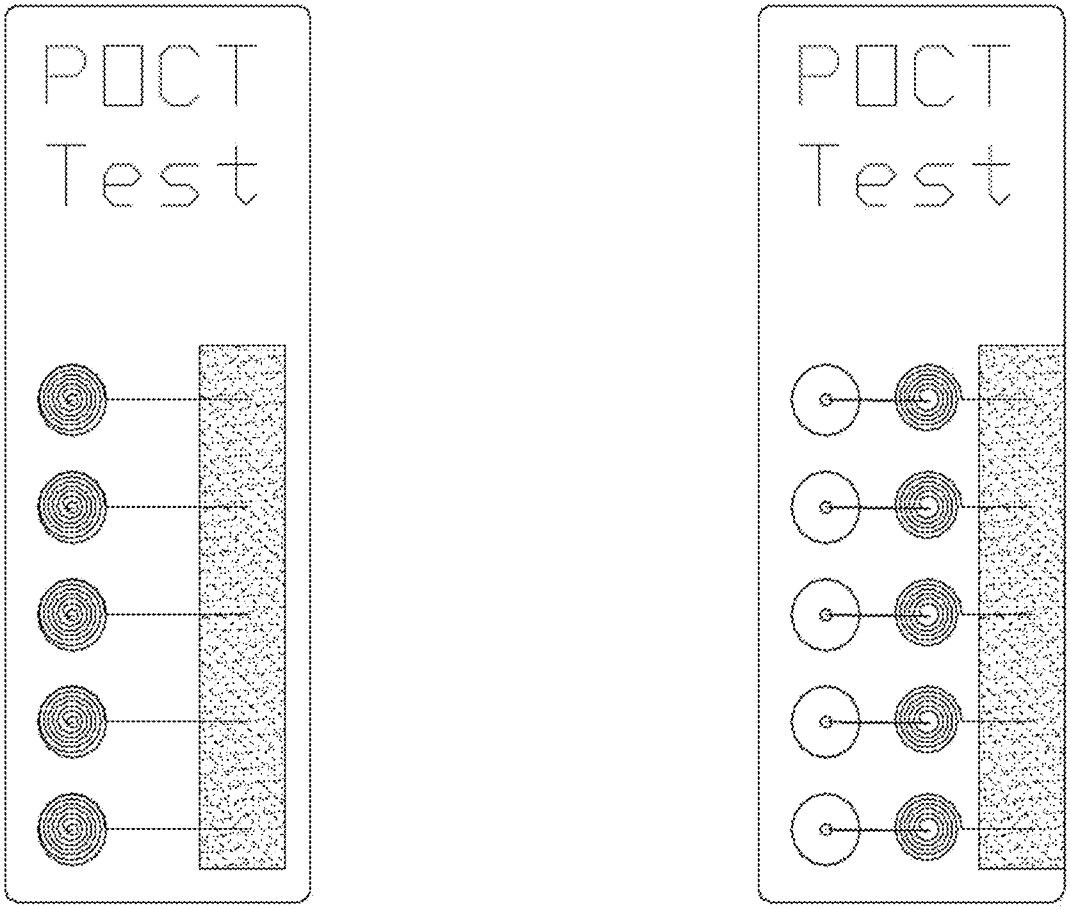
FIG. 24 shows an embodiment of the present invention adapted for a completely manual point-of-care assay test

FIG. 24 shows an embodiment especially suited for point-of-care tests (POCT). This is simply a reduced version of the microplate configuration and can be used as a fully manual point-of-care (POC) assay system. FIG. 24A shows a device exactly identical to the ones described earlier except with reduced number of loading/detection structures whereas FIG. 24B shows an alternate embodiment wherein the microchannel structure is not in the same vertical line of sight as the loading wells. The "semi-auto" microfluidic microplate designs illustrated in FIGS. 21C and 21D and described previously are also well suited for a semi-auto POCT.

FIG. 25 shows a fabricated Optimise™ microplate in accordance with the present invention with the footprint and well layout of a conventional 96 well plate and FIG. 26 shows another embodiment of the microfluidic microplate. FIG. 27 shows comparative data from a microfluidic microplate and a conventional microplate using a chemifluorescence based assay; clearly highlighting the sample/reagent savings and speed advantage of the microfluidic microplate.

1) Traditional 96-Well Assay for IL-6:
  - Anti IL-6 Capture antibody (100 μl, 2 μg/ml)—add and incubate for 1.5 hours at 37 deg C.
  - Washing (TBS-T20 3 times, TBS 2 times) (T20→Tween 20 detergent); 300 μl buffer each step
  - Blocking, 300 μL, 1.5 hrs incubation in 37 C
  - Washing (TBS-T20 3 times, TBS 2 times)
  - IL-6 antigen, serial concentrations, 100 μL, 1.5 hrs incubation in 37 C
  - Washing (TBS-T20 3 times, TBS 2 times)
  - Anti-IL-6 detection antibody, 2 μg/mL, 100 μL, 1.5 hrs incubation in 37 C
  - Washing (TBS-T20 3 times, TBS 2 times)
  - HRP labeled anti-Anti-IL-6 detection antibody, 5 μg/mL, 100 μL, 1.5 hrs incubation in 37 C
  - Washing (TBS-T20 3 times, TBS 2 times)
  - 50 μL of chemifluorescence substrate
  - Detection of chemifluorescence signal using Biotek FLX-800 fluorescence reader 2) Micro-Channel 96-Well
  - Anti IL-6 Capture antibody (7 μl, 2 μg/ml)—add and incubate for 5 minutes at room temp (~23 C)
  - Blocking, 7 μL, 5 minutes at room temp
  - IL-6 antigen, serial concentrations, 30 μL (or 100 μl), 5 min at room temp
  - Anti-IL-6 detection antibody, 2 μg/mL, 7 μL, 5 min incubation at Room temp
  - HRP labeled anti-Anti-IL-6 detection antibody, 5 μg/mL, 7 μL, 5 min at room temp
  - Washing (TBS-T20, TBS); 20 μl wash buffer each step
  - 7 μL of chemifluorescence substrate
  - Detection of chemifluorescence signal using Biotek FLX-800 fluorescence reader FIG. 28 shows the test data from a microfluidic microplate in accordance with the invention and from a conventional microplate using a chemiluminescence based assay. Note that for the microfluidic microplate, in order to avoid the optical "cross-talk" for chemiluminescence as discussed earlier, the assays were conducted one well at a time (i.e. in a given experiment, only one well was tested at a time). The following assays were conducted:

3) Traditional 96-Well:
  - Capture Myoglobin antibody, 1 μg/mL, 100 μL, 1.5 hrs incubation in 37 C
  - Washing (TBS-T20 3 times, TBS 2 times)
  - Blocking, 300 μL, 1.5 hrs incubation in 37 C
  - Washing (TBS-T20 3 times, TBS 2 times)
  - Myoglobin antigen, serial concentrations, 100 μL, 1.5 hrs incubation in 37 C
  - Washing (TBS-T20 3 times, TBS 2 times)
  - AP conjugated detection Myoglobin antibody, 1 μg/mL, 100 μL, 1.5 hrs incubation in 37 C
  - Washing (TBS-T20 3 times, TBS 2 times)
  - 50 μL, of AP substrate
  - Detection of chemiluminescence signal using Turner Biosystem GloRunner luminometer 4) Micro-Channel 96-Well
  - Capture Myoglobin antibody, 20 μg/mL, 5 μL, 5 minutes incubation in room temperature (23 C)
  - Blocking, 10 μL, 5 minutes incubation in room
  - Myoglobin antigen, serial concentrations, 5 minutes incubation in room temperature (23 C)
  - AP conjugated detection Myoglobin antibody, 20 μg/mL, 5 μL, 5 minutes incubation in room temperature (23 C)
  - Washing: TBS-T20, 30 μL, 2 times, TBS, 30 μL, 1 times
  - 5 μL of AP substrate
  - Detection of chemiluminescence signal using Turner Biosystem GloRunner luminometer The absolute signal from the microfluidic microplate of the invention is lower owing to the lower substrate volume which is expected. As seen from FIG. 28, more importantly the data trend is similar for both platforms indicating the microfluidic microplate is a viable assay platform for chemiluminescence detection mode as well. As is also evident, other detection modalities such as electrochemical detection are also possible with the microfluidic microplate by depositing an array of electrode patterns in suitable proximity to the microchannels.

To summarize, the present invention advantageously provides a simple means of integrating microfluidic channels with an array of wells on a platform conforming to the standards of the SBS/ANSI. For example, this invention unexpectedly has been found to provide the following advantages and may be used in multiple applications to replace conventional microplates.

Advantages

1. The μf96 (or Optimiser™) plate combines the speed and versatility of microfluidic approach with the well established 96 well platform.
2. As far as the user is concerned; the operation is exactly identical to a conventional 96 well plate in fact with a reduced number of steps.
3. The μf96 (or Optimiser™) plate can potentially significantly reduce reagent consumption and/or sample requirement. For relatively high abundance samples; sample volume as low as 0.4 μl may be sufficient (for 50 μm spiral channel configuration). This is also important for using lower amounts of reagents—e.g. antibodies in an immunoassay application.
4. The μf96 (or Optimiser™) plate can be significantly faster than a conventional 96 well plate in applications such as immunoassays. A full set of 96 assays can be potentially completed in 5-30 minutes as opposed to hours on a regular 96 well plate.
5. The cost of a μf96 (or Optimiser™) plate can be comparable to a conventional plate since it also a single injection molding operation. The slight added costs due to (a) microfabricated master mold on one side; and (b) pad layer will be well offset by the lower reagent consumption and faster analysis times, 6. The basic approach is extremely versatile and lends itself to a wide variety of applications not only in a lab setting but also for point-of-care test devices.
7. Since the flow is governed only by geometric and material effects, there is reduced operator error which will lead to more reproducible results.
8. Just like a 96 well plate, the µf96 (or Optimiser™) plate operation can also be fully automated. In fact the µf96 (or Optimiser™) would only require a plate handling and robotic reagent dispensing system. Compared to a 96 well plate which requires (i) plate handling system, (ii) robotic reagent dispensing system; (iii) incubation system (owing to long incubation times); and (iv) plate washing system; this is a much reduced instrument load for full automation.

Additional embodiments, as well as features, benefits and advantages, of the present invention will be apparent to those skilled in the art, taking into account the foregoing description of preferred embodiments of the invention. It is therefore to be appreciated that the present invention is not to be construed as being in any way limited by the foregoing description of such preferred embodiments, but that various changes and modifications can be made to the invention as specifically described herein, and that all such changes and modifications are intended to be within the scope of the present invention. Any such limitations are only to be construed as being defined by the claims appended hereto.

What is claimed is:

1. A microfluidic microplate comprising:

a plurality of cells, each of the plurality of cells comprising:

a well structure including a side wall for a loading well;

a through hole at a center of a base of the well structure;

a microfluidic channel formed in a spiral pattern configured to start from a first end of the microfluidic channel and end with a second end of the microfluidic channel at the base of the well structure, wherein the first end of the microfluidic channel is connected to the through hole, and the second end of the microfluidic channel includes an outlet hole; and a sealing layer configured to seal the microfluidic channel, the sealing layer being attached to the base of the loading well, wherein a linear distance between the first end and the second end is less than a radius of a top of the loading well, and wherein each of the plurality of cells comprises a microfluidic channel formed in the same spiral pattern that starts from each of the centers of the bases of the plurality of cells.

2. The microfluidic microplate of claim 1, wherein the linear distance between the first end and the second end is less than about 3 millimeters.

3. The microfluidic microplate of claim 1, wherein the microfluidic channel comprises:

an initial section channel;

an intermediate section channel; and an end section channel, wherein a cross section dimension of the initial section channel is smaller than a cross section dimension of the intermediate section channel, and a cross section dimension of the intermediate section channel is smaller than a cross section dimension of the end section channel.

4. The microfluidic microplate of claim 1, further comprising:

an absorbent pad connected to the outlet of the microfluidic channel.

5. The microfluidic microplate of claim 1, wherein the sealing layer is an adhesive film having hydrophilic characteristic.

6. The microfluidic microplate of claim 1, wherein a cross sectional area of the first end of the microfluidic channel is larger than the through hole.

7. The microfluidic microplate of claim 4, wherein the sealing layer includes an opening exposed to the absorbent pad.

8. The microfluidic microplate of claim 1, further comprising:

an array of pillars within the microfluidic channel.

9. The microfluidic microplate of claim 1, wherein dimensions of the microplate conform to ANSI standards.

10. A microfluidic microplate comprising:

a plurality of cells, each of the plurality of cells comprising:

a well structure including a side wall for a loading well;

a through hole at a base of the well structure;

a microfluidic channel formed at the base of the well structure, wherein one end of the microfluidic channel is connected to the through hole, and other end of the microfluidic channel includes an outlet hole; and a sealing layer configured to seal the microfluidic channel, the sealing layer being attached to the base of the loading well, wherein each of the microfluidic channels of the plurality of cells is connected to none of the microfluidic channels of a rest of the plurality of cells.

11. The microfluidic microplate of claim 10, wherein the microfluidic channel is formed in a serpentine pattern.

12. The microfluidic microplate of claim 11, wherein the microfluidic channel is continuously tapered from the one end of the microfluidic channel to the other end of the microfluidic channel.

13. The microfluidic microplate of claim 11, further comprising:

an array of beads packed in the microfluidic channel.

14. A microfluidic microplate comprising:

a plurality of cells, each of the plurality of cells comprising:

a well structure including a loading well;

a through hole at a base of the well structure; and a channel layer including a first microfluidic channel formed in a spiral pattern on a top surface of the channel layer and a second microfluidic channel formed in a spiral pattern on a bottom surface of the channel layer, wherein the top surface of the channel layer is attached to a bottom of the well structure and the bottom surface of the channel layer is sealed by a sealing layer and one end of the first microfluidic channel is connected to the through hole.

15. The microfluidic microplate of claim 14, further comprising:

an absorbent pad connected to an outlet of the second microfluidic channel.

16. The microfluidic microplate of claim 15, wherein the sealing layer includes an opening exposed to the absorbent pad.

17. The microfluidic microplate of claim 14, wherein the sealing layer is an adhesive film having hydrophilic characteristic.

18. The microfluidic microplate of claim 14, wherein the first microfluidic channel is connected to the second microfluidic channel.

19. The microfluidic microplate of claim 14, wherein a cross sectional area of the one end of the first microfluidic channel is larger than the through hole.

20. The microfluidic microplate of claim 14, wherein a width of the through hole is greater than a depth of the through hole.

* * * * *